(12) United States Patent
Kikuchi

(10) Patent No.: US 10,101,950 B2
(45) Date of Patent: Oct. 16, 2018

(54) IMAGE FORMING APPARATUS, INFORMATION PROCESSING APPARATUS AND CONTROL METHOD THEREOF, AND STORAGE MEDIUM STORING A PROGRAM

(71) Applicant: CANON KABUSHIKI KAISHA, Tokyo (JP)

(72) Inventor: Shou Kikuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 14/537,028

(22) Filed: Nov. 10, 2014

(65) Prior Publication Data

US 2015/0138596 A1    May 21, 2015

(30) Foreign Application Priority Data

Nov. 19, 2013   (JP) ................................. 2013-239236

(51) Int. Cl.
*G06K 15/00* (2006.01)
*G06F 3/12* (2006.01)

(52) U.S. Cl.
CPC .......... *G06F 3/1207* (2013.01); *G06F 3/1203* (2013.01); *G06F 3/1204* (2013.01); *G06F 3/1259* (2013.01); *G06F 3/1263* (2013.01); *G06F 3/1275* (2013.01)

(58) Field of Classification Search
CPC .... G06F 3/1207; G06F 3/1204; G06F 3/1275; G06F 3/1263; G06K 15/005
USPC ...................................................... 358/1.15
See application file for complete search history.

(56) References Cited

U.S. PATENT DOCUMENTS

| 7,495,784 | B2 * | 2/2009 | Hagiwara | .......... G03G 15/5012 358/1.12 |
| 7,752,566 | B1 * | 7/2010 | Nelson | ................... G06F 3/0412 715/768 |
| 2004/0083147 | A1 * | 4/2004 | Aoki | ....................... G06Q 30/04 705/34 |
| 2004/0170443 | A1 * | 9/2004 | Maeshima | ............. G03G 15/50 399/82 |
| 2005/0036170 | A1 * | 2/2005 | Okuoka | ............. H04N 1/00957 358/1.16 |

(Continued)

FOREIGN PATENT DOCUMENTS

| JP | 2002-63004 | 2/2002 |
| JP | 2003-283715 | 10/2003 |

(Continued)

OTHER PUBLICATIONS

Japanese Office Action dated Aug. 18, 2017 during prosecution of related Japanese application No. 2013-239236.

*Primary Examiner* — Neil R McLean
*Assistant Examiner* — Darryl V Dottin
(74) *Attorney, Agent, or Firm* — Fitzpatrick, Cella, Harper & Scinto

(57) ABSTRACT

An image forming apparatus and an information processing apparatus, and control methods thereof, store information of jobs that have been input, and display, in a display unit, a list of the stored jobs in an order in which the jobs are to be executed. Then, in the displayed job list, a job is moved in the list in response to a user operation for changing an execution order of the jobs, and a condition of the job that will occur after the job is moved is displayed while the job is being moved.

29 Claims, 20 Drawing Sheets

(56) References Cited

U.S. PATENT DOCUMENTS

| | | | | |
|---|---|---|---|---|
| 2006/0212819 A1* | 9/2006 | Tobioka | ............... | G06F 3/04817 |
| | | | | 715/764 |
| 2006/0221384 A1* | 10/2006 | Tanaka | ................... | G06F 3/1213 |
| | | | | 358/1.15 |
| 2007/0171454 A1* | 7/2007 | Takahashi | ................. | B42B 4/00 |
| | | | | 358/1.14 |
| 2010/0026740 A1* | 2/2010 | Noguchi | ............... | B41J 2/17566 |
| | | | | 347/6 |
| 2013/0070282 A1* | 3/2013 | Takahashi | ............. | G06F 3/1222 |
| | | | | 358/1.14 |
| 2013/0329254 A1* | 12/2013 | Akashi | ......................... | 358/1.15 |
| 2014/0078548 A1* | 3/2014 | Kikuchi | ................ | G06F 3/1203 |
| | | | | 358/1.15 |

FOREIGN PATENT DOCUMENTS

| | | |
|---|---|---|
| JP | 2007-83501 | 4/2007 |
| JP | 2011-48158 | 3/2011 |
| JP | 2011-51293 | 3/2011 |
| JP | 2011-253409 | 12/2011 |
| JP | 2013-52617 | 3/2013 |

* cited by examiner

FIG. 3A

| | JOB | PAGE | COPIES | STATUS |
|---|---|---|---|---|
| PRINT | 1 | | | |
| | 2 | | | |
| | 3 | | | |
| | 4 | | | |
| | 5 | | | |

| | JOB | PAGE | COPIES | STATUS |
|---|---|---|---|---|
| PRINT | JobA | | | PRINTING |
| | JobB | | | STANDING BY |
| | JobC | | | STANDING BY |
| | JobD | | | STANDING BY |
| | JobE | | | STANDING BY |

FIG. 4A

| | JOB | PAGE | COPIES | STATUS |
|---|---|---|---|---|
| PRINT | JobA | | | PRINTING |
| | JobD | | | STANDING BY |
| | | | | STANDING BY |
| | JobC | | | STANDING BY |
| | JobD | | | STANDING BY |
| | JobE | | | STANDING BY |

| | JOB | PAGE | COPIES | STATUS |
|---|---|---|---|---|
| PRINT | JobA | | | PRINTING |
| | JobD | | Start:16:30 End:17:00 | ING BY |
| | JobC | | | STANDING BY |
| | JobD | | | STANDING BY |

| | JOB | PAGE | COPIES | STATUS |
|---|---|---|---|---|
| PRINT | JobA | | | PRINTING |
| | JobB | | | STANDING BY |
| | JobA | | | PRINTING |
| | JobC | | | PRINTING WILL BE STOPPED. |
| | JobD | | | STANDING BY |

FIG. 8B

| | JOB | PAGE | COPIES | STATUS |
|---|---|---|---|---|
| PRINT | JobA | | | PRINTING |
| | JobB | | | |
| | JobA | | | |
| | JobC | | | PRINTING ORDER WILL BE CHANGED FOR ALL JOBS IN GROUP. |
| | JobD | | | GROUP JOBS CURRENTLY BEING PRINTED WILL BE STOPPED. |

FIG. 10A

| PRINTING ORDER | JOB ID | JOB NAME | PAPER TYPE | NUMBER OF COPIES | NUMBER OF PRINTED SHEETS | FINISHING | JOB STATE | Group |
|---|---|---|---|---|---|---|---|---|
| 0001 | 0001 | JobA | A4 STANDARD PAPER | 1 | 500 | NONE | PRINTING | A |
| 0002 | 0002 | JobB | A4 STANDARD PAPER | 1 | 10 | CASE-BINDING | STANDING BY | |
| 0003 | 0003 | JobC | LTR STANDARD PAPER | 2 | 600 | NONE | STANDING BY | A |
| 0004 | 0004 | JobD | LTR HEAVY PAPER | 1 | 100 | Staple | STANDING BY | |
| 0005 | 0005 | JobE | LTR STANDARD PAPER | 2 | 100 | NONE | STANDING BY | |

FIG. 10B

| PRINTING ORDER | JOB ID | JOB NAME | PAPER TYPE | NUMBER OF COPIES | NUMBER OF PRINTED SHEETS | FINISHING | JOB STATE | Group |
|---|---|---|---|---|---|---|---|---|
| 0001 | 0001 | JobA | A4 STANDARD PAPER | 1 | 500 | NONE | PRINTING | A |
| 0002 | 0004 | JobD | LTR HEAVY PAPER | 1 | 100 | Staple | STANDING BY | |
| 0003 | 0002 | JobB | A4 STANDARD PAPER | 1 | 10 | CASE-BINDING | STANDING BY | |
| 0004 | 0003 | JobC | LTR STANDARD PAPER | 2 | 600 | NONE | STANDING BY | A |
| 0005 | 0005 | JobE | LTR STANDARD PAPER | 2 | 100 | NONE | STANDING BY | |

F I G. 17A
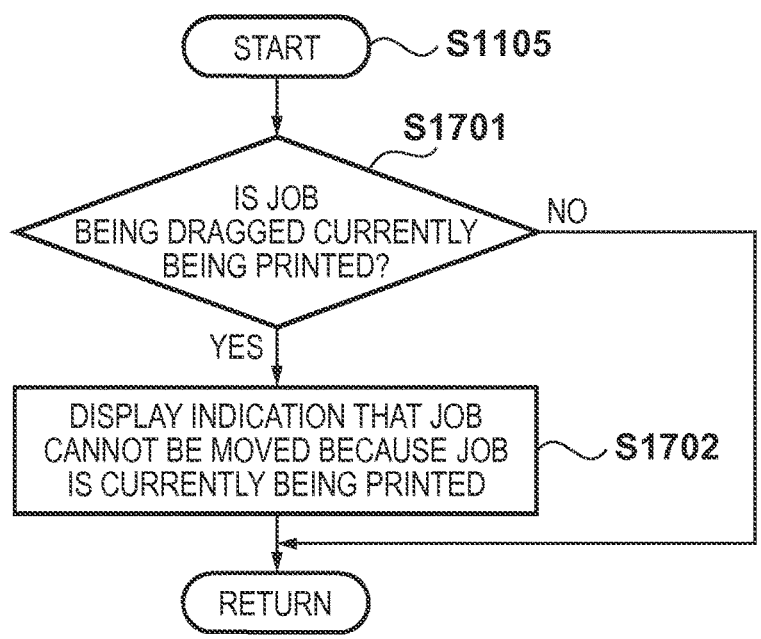
F I G. 17B
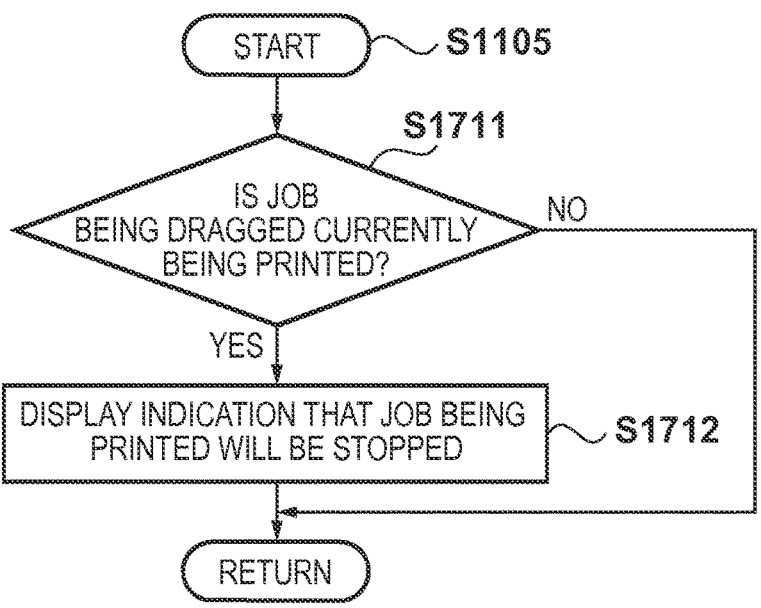

IMAGE FORMING APPARATUS, INFORMATION PROCESSING APPARATUS AND CONTROL METHOD THEREOF, AND STORAGE MEDIUM STORING A PROGRAM

BACKGROUND OF THE INVENTION

Field of the Invention

The present invention relates to image forming apparatuses, information processing apparatuses and control methods thereof, and storage media that store programs.

Description of the Related Art

When executing multiple print jobs, there are cases where a user wishes to change the execution order of print jobs that have already been instructed to be printed. In such cases, the user has conventionally changed the order of the multiple print jobs by first canceling the original printing instructions and then reissuing the printing instructions according to the desired printing order. Alternatively, a user has changed printing orders by setting a print job that is to be placed earlier in the printing order as an interrupt job, with that print job then being executed before print jobs for which printing instructions have already been made.

However, with the former method, in which all the print jobs are canceled and the printing instructions are then reissued, it is necessary to carry out complicated procedures, operations for switching among screens, and so on. On the other hand, with the latter method in which a specific print job is placed earlier in the execution order using an interrupt job, it is necessary to take into consideration a variety of factors such as the properties of the interrupt job, the timing at which the interrupt job is to be executed, and so on, which has made it difficult to change the printing order according to the user's intentions.

Accordingly, Japanese Patent Laid-Open No. 2002-63004 discloses a method through which a user more intuitively changes the execution order of print jobs. According to this method, a user changes the order of print jobs by dragging and dropping print jobs in a print job list displayed in a touch panel, which enables the user to change the print job execution order.

This conventional technique makes it possible to intuitively change the execution order of print jobs. However, changes in the printing conditions, such as the start time and end time of the print job, changes in productivity arising due to jobs in front of and behind the print job being changed, and so on cannot be known until the print job itself is actually executed. The user has thus been forced to change the print job execution order by using his or her experience or instinct to predict or imagine how the printing conditions will change in response to a change in the print job execution order. As a result, changing the print job execution order has had the potential to produce printing conditions that the user did not expect.

SUMMARY OF THE INVENTION

An aspect of the present invention is to eliminate the above-mentioned problems with the conventional technology.

According to the present invention, when changing an execution order of a job by moving the job in a job list, changes in job conditions produced when the execution order of the job is changed are displayed so as to present the changes in the job conditions to a user before actually executing the jobs in the new order.

The present invention in one aspect provides an image forming apparatus an image forming apparatus comprising: a storage unit configured to store information of jobs that have been input; a display processing unit configured to display, in a display unit, a list of jobs stored in the storage unit, in an order in which the jobs are to be executed; a movement unit configured to move a job in the list in response to a user operation for changing an execution order of a job in the list of jobs displayed in the display unit; and a job condition display unit configured to display, while the job is being moved by the movement unit, a condition of the job that will occur after the job has been moved.

According to the present invention, when changing an execution order of a job by moving the job in a job list, changes in job conditions produced when the execution order of the jobs is changed can be displayed. Accordingly, the execution order of jobs can be changed with a user understanding the resulting changes in the job conditions, which makes it possible to prevent an unintended situation from arising due to the execution order of the jobs being changed.

Further features of the present invention will become apparent from the following description of exemplary embodiments with reference to the attached drawings.

BRIEF DESCRIPTION OF THE DRAWINGS

FIG. 3A is a diagram illustrating the configuration of a print job list displayed in an operating panel, and FIG. 3B is a diagram illustrating an example of the print job list displayed in the case where five types of print jobs are held in a print queue.

FIG. 4A is a diagram illustrating a state in which the line of a print job (Job D) whose printing order is to be changed is selected and dragged by the user, from the state shown in FIG. 3B, and FIG. 4B is a diagram illustrating a state in which the line of the print job (Job D) has moved to directly below the line of a print job (Job A) due to the dragging operation.

FIG. 8A is a diagram illustrating an example of a display indicating that a printing process executed by a print job that is currently being printed will be stopped due to that print job being moved, and FIG. 8B is a diagram illustrating an example of a display made when the line of a print job (Job A) currently being executed is dragged and moved.

FIGS. 10A and 10B are diagrams illustrating an example of a print job management table that manages the print jobs held in the print queue.

FIGS. 17A and 17B are flowcharts illustrating processing in the case where the processing of S1105 in FIG. 11 permits the printing order of a print job currently being printed to be changed.

DESCRIPTION OF THE EMBODIMENTS

Figure 1:
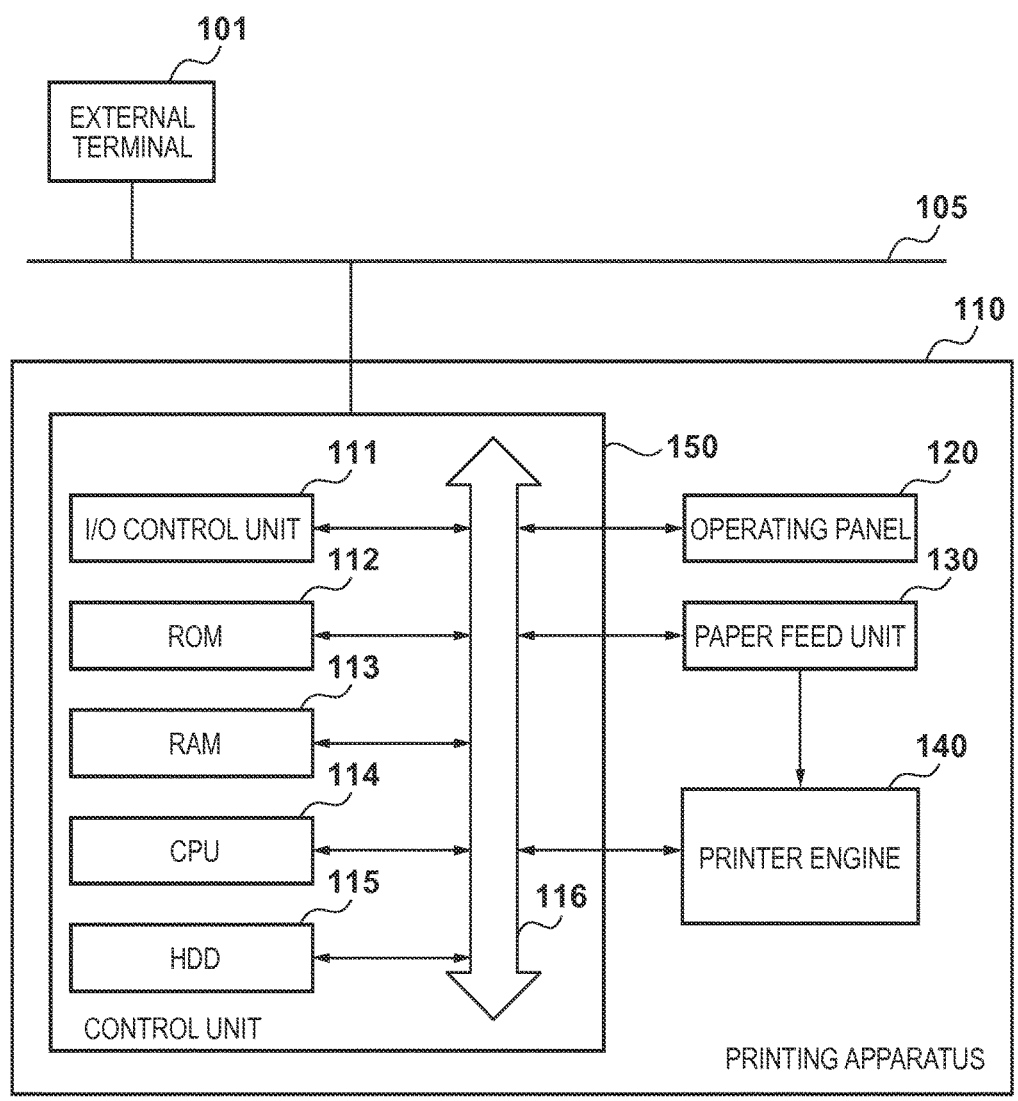
FIG. 1 is a block diagram illustrating the configuration of a system including a printing apparatus serving as an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be given identical reference numerals, and descriptions thereof will be omitted.

FIG. 1 is a block diagram illustrating the configuration of a system including a printing apparatus 110, serving as an embodiment of an image forming apparatus according to the present invention.

In the system, an external terminal 101, which is an information processing apparatus such as a PC or the like, is connected to the printing apparatus 110 via a network 105. Of course, a plurality of external terminals 101 may be connected to the network 105, and multiple users can use their own computers as such external terminals.

The external terminal 101 executes various types of applications, obtains input information from a user through those applications, generates a print job to be sent to the printing apparatus 110, and sends the generated print job to the printing apparatus 110 via the network 105.

The configuration of the printing apparatus 110 will be described next.

A control unit 150 includes an I/O control unit 111, a ROM 112, a RAM 113, a CPU 114, an HDD 115, and a system bus 116. The control unit 150 controls the operations of the printing apparatus 110 by performing various types of data processes. An operating panel 120 accepts various types of operations from the user through a UI such as a touch panel or the like. A paper feed unit 130 includes a plurality of paper feed trays, with each paper feed tray being capable of holding a plurality of sheets of paper; during printing, a sheet of paper fed from a selected paper feed tray is transported to a printer engine 140, and that sheet is then printed onto. The printer engine 140 prints images onto the sheet in accordance with image data.

The configuration of the control unit 150 will be described next.

The I/O control unit 111 controls communication with the external terminal 101 via the network 105. The ROM 112 stores a boot program, and when the power is turned on, the CPU 114 executes the boot program and reads out and loads an OS, control programs, and the like installed in the HDD 115 into the RAM 113. The RAM 113 functions as a main memory for storing the control programs, and also provides a work area used when the CPU 114 executes control processes. The CPU 114 controls operations performed by the printing apparatus 110 as a whole by executing the control programs loaded into the RAM 113. The HDD 115 is used in order to hold large pieces of data, such as programs, image data, print data, and the like, temporarily or for long periods of time. The system bus 116 connects the CPU 114 to the aforementioned respective units and transfers control signals, data, addressing signals, and the like therebetween. An NVRAM (not shown) may further be provided, and may store mode information from the operating panel 120. Meanwhile, a job list, which is a list of print jobs and will be described later, is displayed in the operating panel 120, and the user can change a print job execution order by dragging and moving the lines of the print jobs in the list.

Figure 2:
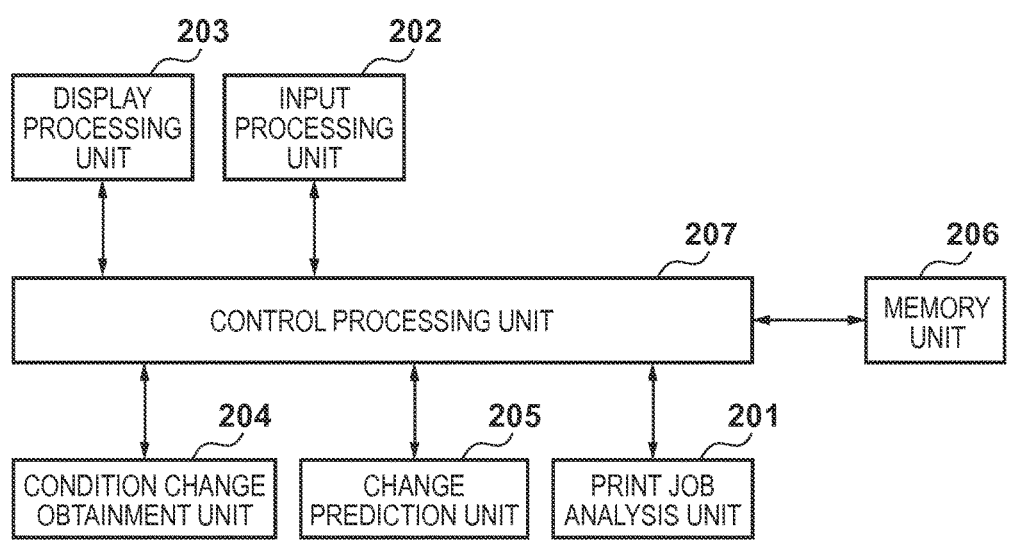
FIG. 2 is a block diagram illustrating program modules in the printing apparatus.

FIG. 2 is a block diagram illustrating the program modules in the printing apparatus 110 according to this embodiment. Note that these program modules indicate functions implemented by the CPU 114 executing programs that have been loaded into the RAM 113.

A print job analysis unit 201 analyzes a print job received from the external terminal 101 and reads out print data, information for print settings, and so on contained in the print job. Note that the "information for print settings" is information primarily regarding settings used in printing, such as paper size, paper type, paper feed tray, finishing settings, and the like. The print settings read out by the print job analysis unit 201 are temporarily saved in a storage unit such as the RAM 113 or the HDD 115. An input processing unit 202 accepts various types of inputs made by an operator through the operating panel 120. A display processing unit 203 displays a list of print jobs, messages (described later), and the like in the operating panel 120. A condition change obtainment unit 204 obtains information indicating how printing conditions have changed compared to a current printing order, in the case where the print job execution order has been changed due to dragging operations as described above. A change prediction unit 205 finds, when the user has dragged a print job in the print job list, a printing order and the like resulting from the print job being dropped, based on coordinate information of the dragged print job and display coordinates in the print job list. A memory unit 206 corresponds to the RAM 113, the HDD 115, and so on, and holds data and the like obtained by the condition change obtainment unit 204, the change prediction unit 205, and so on. A control processing unit 207 controls the execution of the aforementioned units.

FIG. 3A is a diagram illustrating the configuration of the print job list displayed in the operating panel 120. The data for this screen is held in the memory unit 206 and is displayed in the operating panel 120 under the control of the CPU 114. The operator can ascertain the print job execution order, printing conditions, and so on by viewing this screen. Note that the data for this screen can also be transferred to the external terminal 101 via the network 105 and displayed, and the external terminal 101 can then accept inputs for that list display.

The reference numeral 301 indicates an area where print job names are displayed. The print jobs are displayed in the area 301 in the order in which the jobs were inserted into the print queue of the RAM 113, and the print job currently being printed or to be printed next is displayed at the top. A number of pages, a number of copies, and so on in each print job, as well as information for each print job such as a current printing state, is displayed in display columns 302 in correspondence with the respective print job names 301. Note that it is not absolutely necessary to continually display this information.

Figure 9A:
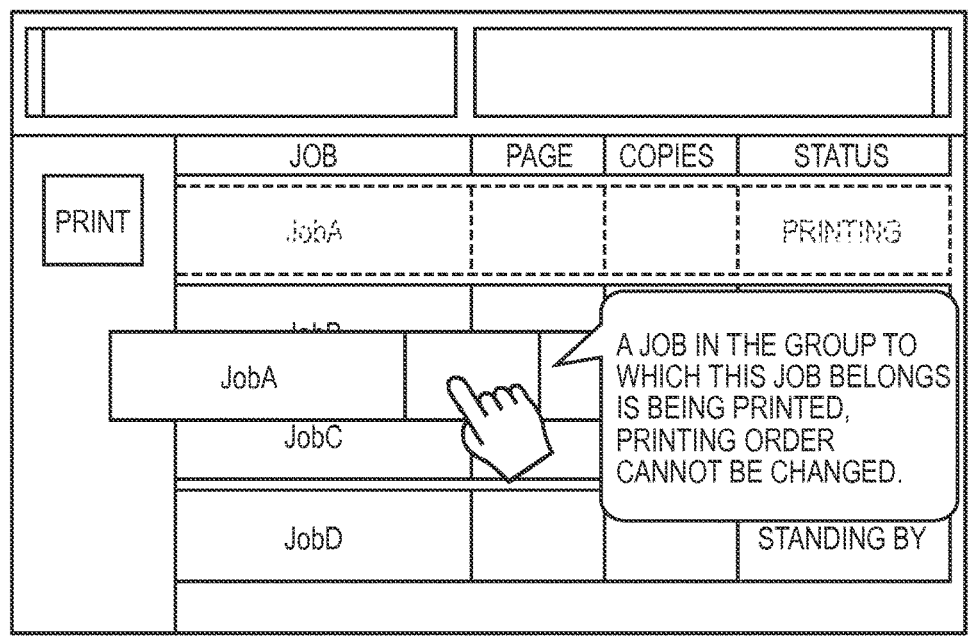
FIG. 9A is a diagram illustrating an example of the display made when the line of a print job (Job A) currently being executed is dragged and moved.
Figure 9B:
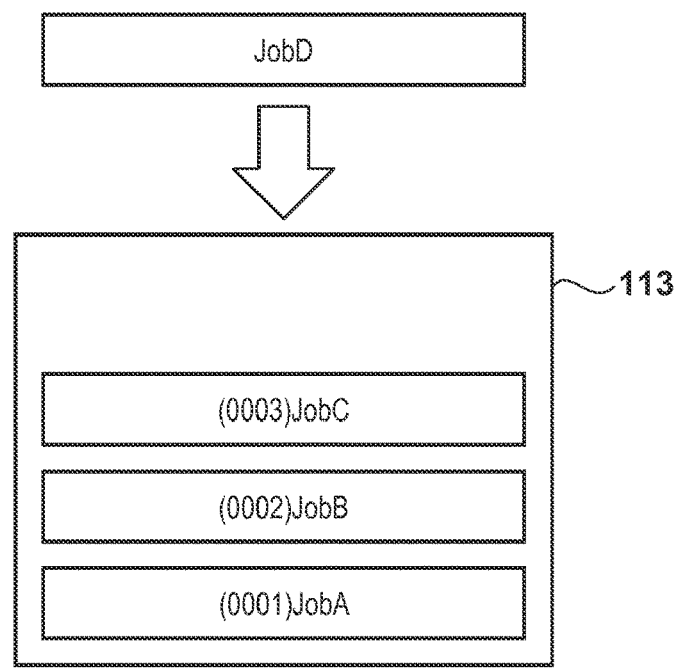
FIG. 9B is a diagram illustrating print jobs analyzed by a print job analysis unit being held in a print queue.

FIG. 9B is a diagram illustrating print jobs analyzed by the print job analysis unit 201 being held in the print queue in the RAM 113, according to this embodiment. The print jobs inserted into the print queue here are managed in a print job management table (FIG. 10) located in the RAM 113. Note that the print job management table (FIG. 10) is updated and the job list screen is rendered periodically even during printing processes.

FIG. 3B is a diagram illustrating an example of the print job list displayed in the case where five types of print jobs (Job A, Job B, Job C, Job D, and Job E) are held in the print queue. In FIG. 3B, the Job A is being printed, and the other print jobs are standing by to be printed.

FIG. 10A is a diagram illustrating an example of the print job management table that manages the print jobs held in the print queue, in the case of the state shown in FIG. 3B. Here, the CPU 114 reads out the information of the print jobs from the print job management table shown in FIG. 10A according to the printing order numbers. The read-out print job information is then passed to the display processing unit 203 and displayed in the operating panel 120.

FIG. 4A is a diagram illustrating a state in which a line 400 of a print job (Job D) whose printing order is to be changed is selected and dragged by the user, from the state shown in FIG. 3B.

FIG. 4B, meanwhile, is a diagram illustrating a state in which the line 400 of the print job (Job D) has moved to directly below the line of a print job (Job A) due to the dragging operation.

When the line 400 of the print job (Job D) is dropped in this state, the display processing unit 203 obtains the coordinate information of where the print job (Job D) was dropped and the information of the dropped print job, and passes the obtained information to the control processing unit 207. As a result, the control processing unit 207 finds a new printing order for the dropped print job from the coordinate information of the position where the job was dropped and the information of the dropped print job, and updates the print job management table. FIG. 4B illustrates a print start time (16:30) and an expected print end time (17:00) for the dropped print job (Job D), and this will be described later.

FIG. 10B is a diagram illustrating an example of the print job management table, updated by the dropping operation being carried out in the state shown in FIG. 4B. In FIG. 10B, the print job (Job D) has moved to behind the print job (Job A), and the print job execution order has been changed accordingly.

When the print job management table is updated in this manner, the CPU 114 reads out the information of the print jobs from the print job management table according to the print job order and displays the information in the operating panel 120. The print job order is changed and displayed in the print job list as a result.

Figure 11:
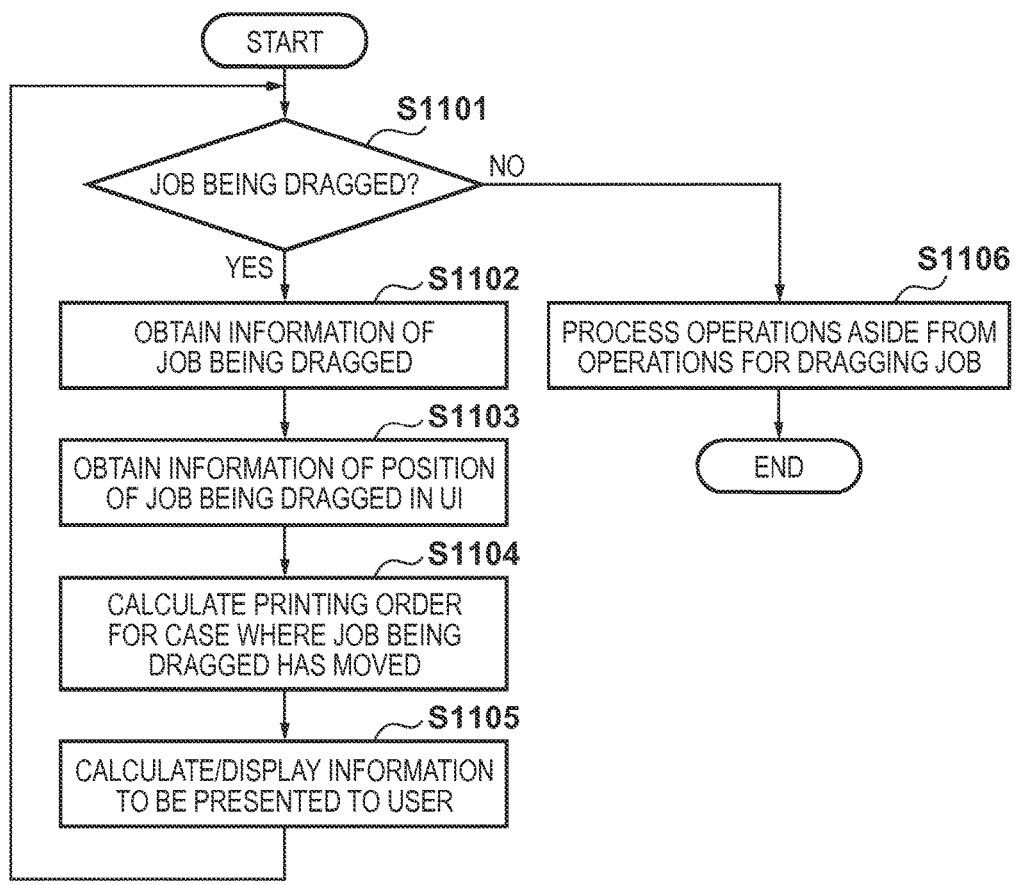
FIG. 11 is a flowchart illustrating processing carried out by a control unit when a user changes the order of print jobs in the operating panel of the printing apparatus.

FIG. 11 is a flowchart illustrating processing carried out by the control unit 150 when the user changes the order of print jobs in the operating panel 120 of the printing apparatus 110 according to this embodiment. Note that the processing illustrated in this flowchart is realized by the CPU 114 executing programs loaded into the RAM 113 at the time of execution. Accordingly, the following descriptions will be given assuming that the CPU 114 carries out the processing indicated in the flowchart.

The user selects the line of the print job whose printing order s/he wishes to change in the print job list displayed in the operating panel 120 and drags that line. The CPU 114 detects the operation made by the user in the operating panel 120. Note that other print job processes may be temporarily stopped while this print job is being dragged, or the drag-and-drop operations may be permitted while other print job are being executed. In S1101, the CPU 114 determines whether or not the stated operation is an operation for dragging the line of a displayed print job, as indicated in FIGS. 4A and 4B, for example. In the case where it is determined that the operation is an operation aside from a print job being dragged, the process moves to S1106, where processing corresponding to that operation is executed. However, in the case where the stated operation is an operation for dropping the print job, in S1106, the print job list whose print job execution order has been changed is displayed in a format that reflects the printing conditions and so on at that point in time.

On the other hand, in the case where it is determined in S1101 that the operation is an operation for dragging the print job, the process moves to S1102, where the CPU 114 obtains the information of the dragged print job from the print job management table stored in the RAM 113. The process then moves to S1103, where the CPU 114 obtains information of the coordinate positions of the line of the print job currently being dragged. Next, the process moves to S1104, where the CPU 114 carries out the following processing based on the display coordinates of the lines of each print job displayed in the print job list, the position information of the line of the print job being dragged obtained in S1103, and the information of the print job being dragged obtained in S1102. That is, the CPU 114 finds how the printing order will change in the case where the line of the print job currently being dragged is dropped at the current display position. Next, the process moves to S1105, where the CPU 114 changes the display in the operating panel 120 based on the current printing order, the printing order found in S1104, and the information of the print job currently being dragged. The above processing is carried out repeatedly during the dragging operation.

Through this processing, the printing apparatus 110 can display information regarding changing printing conditions in the operating panel 120 when the user drags the line of a print job, the line is dropped at position to which the line has been dragged, and the print job order changes as a result. Accordingly, the user can ascertain how the printing conditions will change if the print job order is changed simply by dragging the line of a print job in the print job list and changing the printing order, without actually changing the print job order and carrying out printing.

Next, specific examples of a job condition display, as well as changes in the job condition display and the like that are displayed as assistance information, will be described in detail.

When Displaying Print Start Time and Print End Time

First, processing performed in the case where a print start time/print end time of a print job is displayed when the line of that print job is moved in the print job list will be described.

Figure 12:
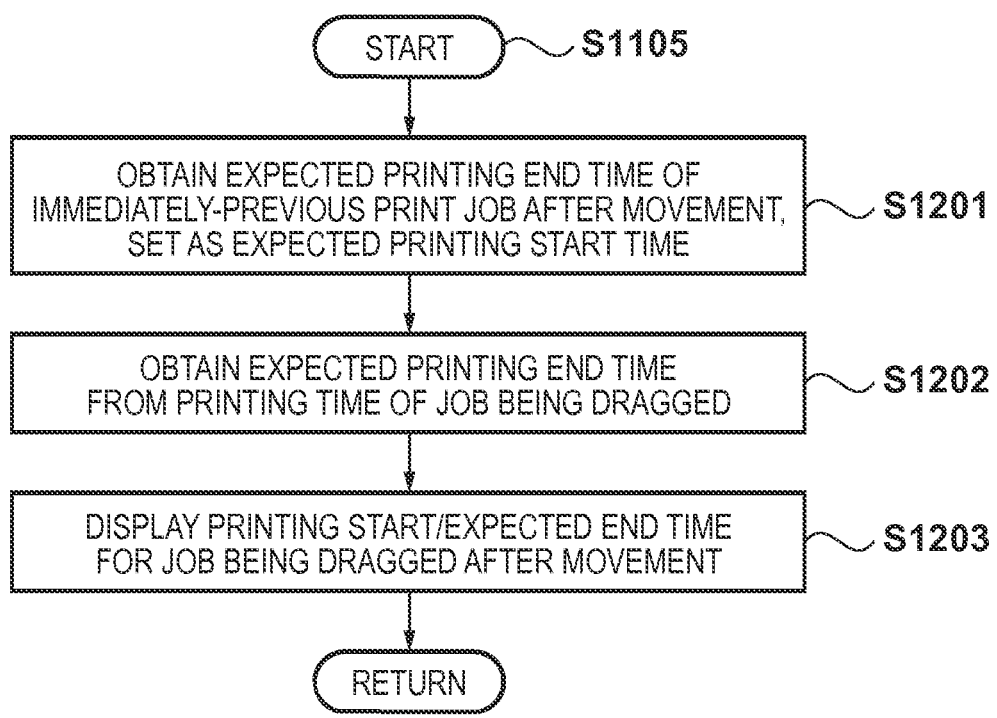
FIG. 12 is a flowchart illustrating processing performed in S1105 of FIG. 11, in the case where printing start and end times are displayed as assistance information of a print job being dragged.

FIG. 12 is a flowchart illustrating processing performed in S1105 of FIG. 11, in the case where printing start and end times are displayed as assistance information of the print job being dragged. Note that the processing illustrated in this flowchart is realized by the CPU 114 executing programs loaded into the RAM 113 at the time of execution. Accordingly, the following descriptions will also be given assuming that the CPU 114 carries out the processing indicated in the flowchart. Note also that the flowchart shown in FIG. 12 illustrates in detail the specific case where the process performed in S1105 of FIG. 11 is a process for displaying the print start time and the print end time. Accordingly, details such as the detection of dragging operations, the obtainment of job information, and so on will be omitted here.

First, in S1201, when the line of the print job being dragged in the print job list stops moving, the CPU 114 obtains a current time as well as print times of the print job currently being printed and all other print jobs expected to be printed before the print job being dragged. Then, the print start time of the print job being dragged is calculated in accordance with the print job order based on the position in which the line of the print job has stopped. Next, the process moves to S1202, where the CPU 114 finds the amount of time needed to print based on the information of the print job being dragged, and calculates the expected print end time based on the amount of time needed to print that has been found and the print start time calculated in S1201. The process then moves to S1203, where the CPU 114 displays the print start time and the expected print end time of the print job being dragged in the operating panel 120 along with the print job being dragged.

FIG. 4B illustrates an example in which the print job being dragged is displayed along with the print start time and the expected print end time occurring when that print job is dropped at the current position.

In the example shown in FIG. 4B, it can be seen that when the print job (Job D) is moved to immediately below the print job (Job A), the print start time of the print job (Job D) is 16:30 and the expected print end time is 17:00. When the user then drops the print job (Job D) at the position to which the job was dragged to as indicated in FIG. 4B, the printing order in the print queue is changed to the order shown in FIG. 10B, for example, in S1106 of FIG. 11. In FIG. 10B, the print job (Job D) is moved behind the print job (Job A), and is followed by a print job (Job B), a print job (Job C), and a print job (Job E).

According to the embodiment as described thus far, when an operation is made for changing the printing order by dragging a print job in the print job list, the print start time and the expected print end time of the print job being dragged can be displayed in real time. As a result, the user can ascertain the print start time and the expected print end time of that print job without actually printing the print job, which increases the convenience for the user.

When Displaying Changes in Productivity Due to Fixer Adjustment

Next, a case where information regarding a change in productivity due to a fixer being adjusted is displayed instead of the aforementioned print start time and expected print end time will be described.

Figure 13:
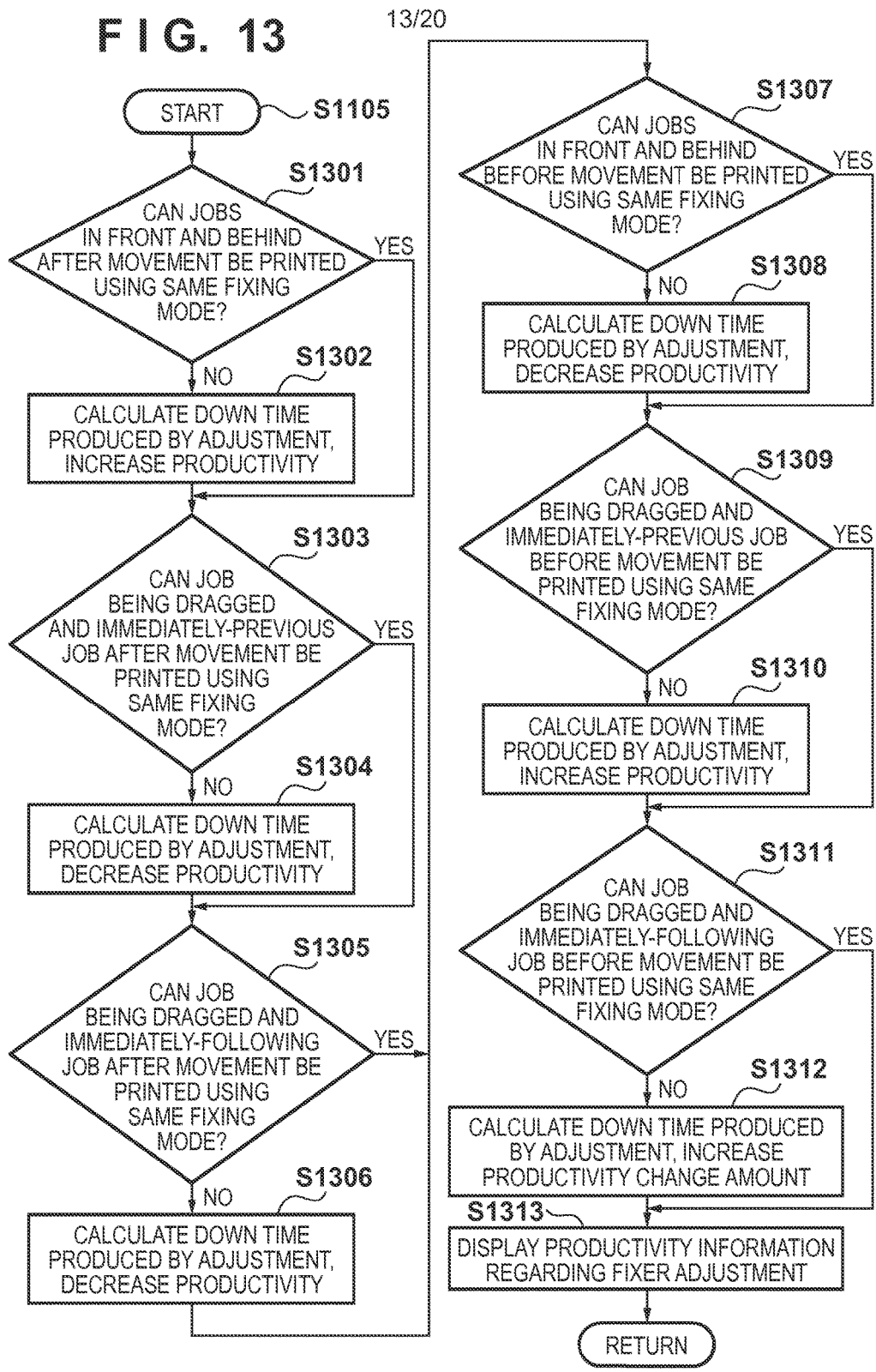
FIG. 13 is a flowchart illustrating a case where the processing of S1105 in FIG. 11 displays a change in productivity caused by the fixer being adjusted.

FIG. 13 is a flowchart illustrating a case where the processing of S1105 in FIG. 11 displays a change in productivity caused by the fixer being adjusted. Accordingly, details such as the detection of dragging operations, the obtainment of job information, and so on will be omitted here.

First, in S1301, when the line of the print job being dragged stops moving, the CPU 114 obtains, from the job management table in the RAM 113, the information of the print jobs located in front of and behind the stopped print job in the print job list. The CPU 114 then determines whether the two obtained print jobs located in front of and behind the stated print job can be printed using the same fixer settings ("fixing mode" hereinafter) based on the paper type contained in the two print jobs. If it is determined that the print jobs can be printed using the same fixing mode, the current order enables the productivity to be increased, and thus the process moves to S1303; however, if it is determined that it is necessary to print using different fixing modes, the process moves to S1302. In S1302, the CPU 114 finds an amount of time required to adjust the fixer in the case where the two print jobs obtained in S1301 are printed in succession. The amount of time found here is assumed to be the amount of time by which the productivity can be increased, and that amount of time is stored in the RAM 113 as a productivity change amount. This is because if the print job currently being dragged is inserted between the stated two print jobs, it will no longer be necessary to adjust the fixer as in the case where the two print jobs are executed in succession, and it is thus determined that the productivity can be increased by that amount.

Next, in S1303, the CPU 114 obtains, from the job management table, information of the print job expected to be executed immediately prior to the print job that has stopped being dragged. Then, based on the paper type contained in the print job being dragged and the paper type contained in the print job expected to be printed immediately prior thereto, it is determined whether or not the two print jobs can be printed using the same fixing mode. If it is determined that the jobs can be printed using the same fixing mode, the productivity can be increased by the amount found in S1302, and thus the process moves to S1305; however, if it is determined that it is necessary to print the jobs using different fixing modes, the process moves to S1304. In S1304, the CPU 114 finds an amount of time required to adjust the fixer in the case where the two print jobs obtained in S1303 are printed in succession. The productivity is determined to drop by the amount of time that has been found, and that amount of time is stored in the RAM 113 as the productivity change amount. This is because in the case where the printing order of the print job currently being dragged is changed to the position in the print job list where the dragging stops, it will become necessary to adjust the fixer, and a drop in productivity equivalent to that amount of time will occur as a result.

Next, the process moves to S1305, where the CPU 114 obtains, from the job management table, information of the print job expected to be printed immediately after the print job that has stopped being dragged. Then, based on the print job being dragged and the paper type contained in the print job expected to be printed immediately after the print job being dragged, the CPU 114 determines whether or not the two print jobs can be printed using the same fixing mode. In the case where it is determined that the jobs can be printed using the same fixing mode, the productivity can be increased by the amount found in S1302, and thus the process moves to S1307; however, in the case where it is determined that it is necessary to print the jobs using different fixing modes, the process moves to S1306. In S1306, the CPU 114 finds an amount of time required to adjust the fixer in the case where the two print jobs obtained in S1305 are printed in succession. The productivity is determined to drop by the amount of time that has been found, and that amount of time is stored in the RAM 113 as the productivity change amount.

The process then moves to S1307, where the CPU 114 obtains, from the job management table, the information of the print jobs originally located in front of and behind the print job being dragged, in the current print job list printing order. For example, in the case where the print job (Job D) is being dragged, the information of the print job (Job C) and the print job (Job E), which are respectively located in front of and behind the print job (Job D) in the list illustrated in FIG. 3B, is obtained. Then, based on the paper type contained in the two obtained print jobs, the CPU 114 determines whether or not the two print jobs can be executed using the same fixing mode. This corresponds to a determination as to whether or not a drop in productivity will occur due to the print job moving and the print jobs in front of and behind that print job being executed in succession as a result; if no drop in productivity occurs, the productivity change amount will not be affected. In the case where it is determined in S1307 that the jobs can be printed using the same fixing mode, the process moves to S1309, whereas in the case where it is determined that the jobs are to be printed using different fixing modes, the process moves to S1308. In S1308, the CPU 114 obtains an amount of time required to adjust the fixer in the case where the two print jobs obtained in S1307 are printed in succession. The productivity is determined to drop by the amount of time that has been obtained, and that amount of time is stored in the RAM 113 as the productivity change amount.

The process then moves to S1309, where the CPU 114 obtains, from the job management table, the information of the print job expected to be printed immediately before the print job being dragged, in the current print job list printing order. For example, in the case where the print job (Job D) is being dragged, the information of the print job (Job C), which is located in front of the print job (Job D) in the list illustrated in FIG. 3B, is obtained. Then, based on the information of the print job being dragged and the paper type contained in the print job expected to be printed immediately before the print job being dragged in the current printing order, the CPU 114 determines whether or not the two print jobs can be printed using the same fixing mode. In the case where it is determined that the jobs can be printed using the same fixing mode, the process moves to S1311, whereas in the case where it is determined that the jobs are to be printed using different fixing modes, the process moves to S1310. In S1310, the CPU 114 finds the information of the print job being dragged as well as an amount of time required to adjust the fixer in the case where the print job being dragged and the print job expected to be printed immediately prior thereto are printed in succession in the current printing order. The amount of time found here is assumed to be the amount of time by which the productivity can be increased, and that amount of time is stored in the RAM 113 as a productivity change amount. This is because when the print job being dragged is moved to another position in the current print job list printing order, it is no longer necessary to adjust the fixer between that print job and the print job expected to be printed immediately prior thereto.

The process then moves to S1311, where the CPU 114 obtains, from the job management table, the information of the print job expected to be printed immediately after the print job being dragged, in the current print job list printing order. For example, in the case where the print job (Job D) is being dragged, the information of the print job (Job E), which is located behind the print job (Job D) in the list illustrated in FIG. 3B, is obtained. Then, based on the information of the print job being dragged and the paper type contained in the print job expected to be printed immediately after the print job being dragged in the current printing order, the CPU 114 determines whether or not the two print jobs can be printed using the same fixing mode. In the case where it is determined that the jobs can be printed using the same fixing mode, the process moves to S1313, whereas in the case where it is determined that the jobs are to be printed using different fixing modes, the process moves to S1312. In S1312, the CPU 114 finds the information of the print job being dragged as well as an amount of time required to adjust the fixer in the case where the print job being dragged and the print job expected to be printed immediately after that print job are printed in succession in the current printing order. The amount of time found here is assumed to be the amount of time by which the productivity can be increased, and that amount of time is stored in the RAM 113 as a productivity change amount.

In this manner, the process moves to S1313, where the CPU 114 finds a total of the productivity change amounts produced by the fixer being adjusted, stored in the RAM 113 in S1302, S1304, S1306, S1308, S1310, and S1312. The productivity change amount for the case where the print job has been moved is displayed in the operating panel 120 at the position where the line of the print job currently being dragged has stopped.

Figure 5A:
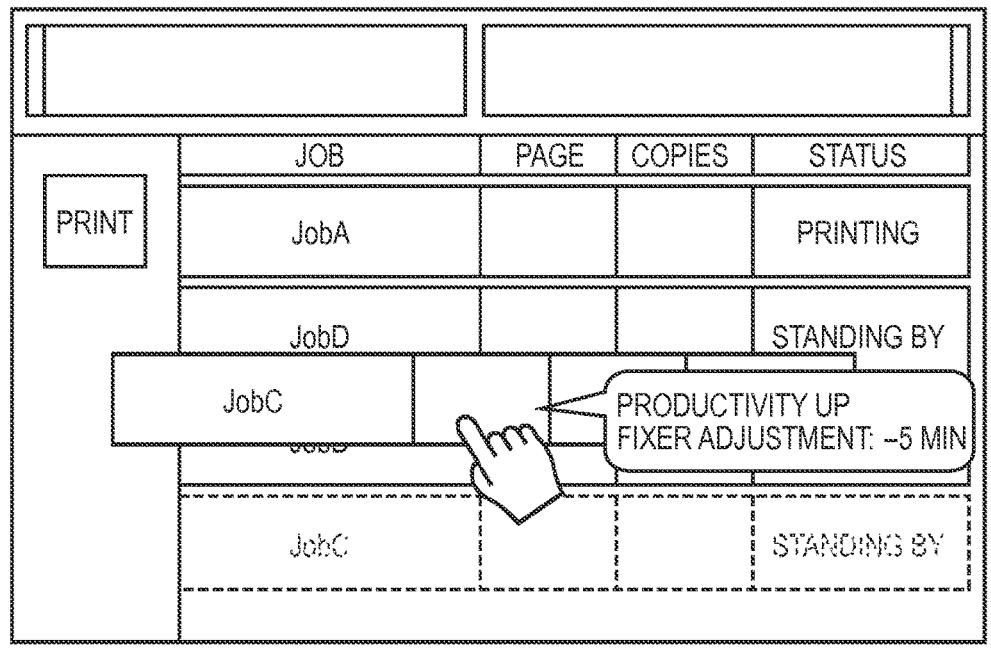
FIG. 5A is a diagram illustrating an example in which a productivity change amount caused by a fixer (fixing unit) being adjusted is displayed when the execution order of print jobs is changed.

FIG. 5A is a diagram illustrating an example in which the productivity change amount caused by the fixer being adjusted is displayed when the print job execution order has been changed.

In FIG. 5A, the display indicates that the productivity will be increased if the print job (Job C) being dragged is moved behind the print job (Job D), with the amount of time required to adjust the fixer dropping by five minutes. In this state, in the case where the user drops the print job (Job C) at the current position, the printing order of the print jobs in the print queue will be changed to Job A, Job D, and Job C in S1106 of FIG. 11.

As described thus far, according to this embodiment, when the line of a print job is dragged in the print job list and the execution order of the print jobs is changed as a result, the productivity change amount resulting from the fixer being adjusted can be displayed in real time, in accordance with the position to which the job has been moved. Accordingly, the user can confirm whether or not the overall productivity of the jobs will drop due to the fixer being adjusted simply by carrying out an operation for changing the print job order, without actually executing the print jobs.

When Displaying Changes in Productivity Due to Case Binder Adjustment

Next, an example of when changes in the productivity caused by a case binder being adjusted are displayed will be described.

Figure 14:
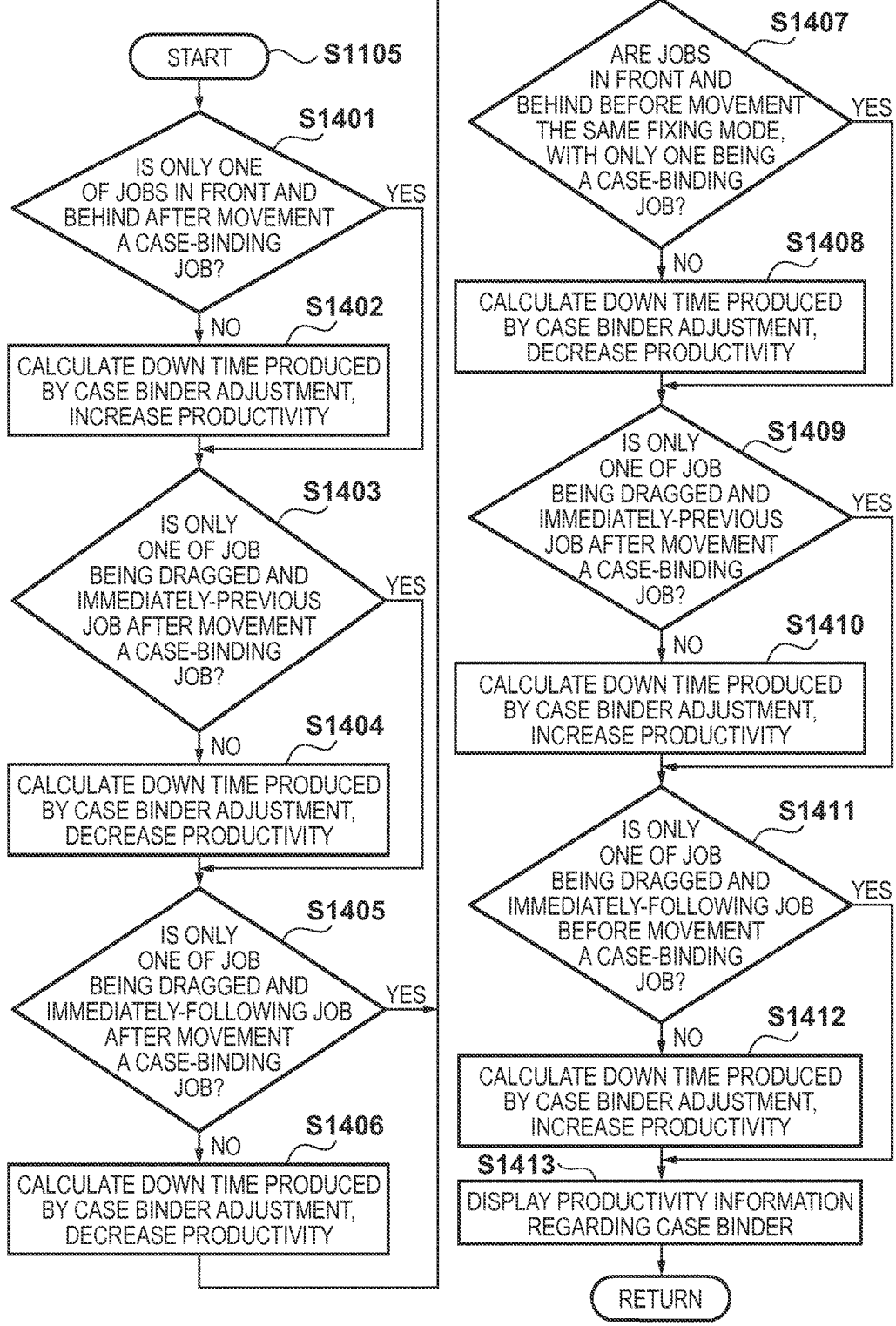
FIG. 14 is a flowchart illustrating a case where the processing of S1105 in FIG. 11 displays a change in productivity caused by the case binder being adjusted.

FIG. 14 is a flowchart illustrating a case where the processing of S1105 in FIG. 11 displays a change in productivity caused by the case binder being adjusted. Accordingly, details such as the detection of dragging operations, the obtainment of job information, and so on will be omitted here.

First, in S1401, when the line of the print job being dragged stops moving, the CPU 114 obtains, from the job management table in the RAM 113, the information of the print jobs located in front of and behind the stopped print job in the print job list. Then, based on the obtained information of the print jobs in front of and behind the stated print job, the CPU 114 determines whether or not case-binding is set for either of those print jobs. In the case where case-binding is set for both of the print jobs or case-binding is not set for either of the print jobs, the process moves to S1403, whereas in the case where case-binding is set for only one of the print jobs, the process moves to S1402. In S1402, the CPU 114 finds an amount of time required to adjust the case binder in the case where the two print jobs obtained in S1401 are printed in succession. The amount of time found here is assumed to be the amount of time by which the productivity can be increased, and that amount of time is set in the RAM 113 as the productivity change amount. This is because in the case where the print job currently being dragged is moved to the position where the current dragging operation has stopped, it will no longer be necessary to adjust the case binder as with the print job order that was present up until that point, and the productivity is increased by that amount as a result.

In S1403, the CPU 114 obtains, from the job management table, information of the print job expected to be executed immediately prior to the print job that has stopped being dragged. The CPU 114 then determines whether or not case-binding is set for either of the print job being dragged or the print job expected to be executed immediately prior to the print job being dragged. In the case where case-binding is set for both of the print jobs or case-binding is not set for either of the print jobs, the process moves to S1405, whereas in the case where case-binding is set for only one of the print jobs, the process moves to S1404. In S1404, the CPU 114 finds an amount of time required to adjust the case binder in the case where the print job being dragged and the print job immediately prior thereto are printed in succession. The productivity is determined to drop by the amount of time that has been found, and that amount of time is stored in the RAM 113 as the productivity change amount. This is because in the case where the print job currently being dragged has moved to the current position, it will be necessary to adjust the case binder, which was not the case with the printing order thus far; a drop in productivity will occur as a result.

Next, the process moves to S1405, where the CPU 114 obtains, from the job management table, information of the print job expected to be printed immediately after the print job that has stopped being dragged. Then, the CPU 114 determines whether or not case-binding is set for only one of the print job that has stopped being dragged and the print job expected to be printed immediately after the print job that has stopped being dragged. In the case where case-binding is set for both of the print jobs or case-binding is not set for either of the print jobs, the process moves to S1407, whereas in the case where case-binding is set for only one of the print jobs, the process moves to S1406. In S1406, the CPU 114 finds an amount of time required to adjust the case binder in the case where the two obtained print jobs are executed in succession. The productivity is determined to drop by the amount of time that has been found, and that amount of time is stored in the RAM 113 as the productivity change amount.

The process then moves to S1407, where the CPU 114 obtains, from the job management table, the information of the print jobs in front of and behind the print job being dragged, in the current print job list printing order. For example, in the case where the print job (Job D) is being dragged, the information of the print job (Job C) and the print job (Job E), which are located in front of and behind the print job (Job D) in the list illustrated in FIG. 3B, is obtained. Then, based on the obtained information of the two print jobs, the CPU 114 determines whether or not case-binding is set for only one of the two print jobs. In the case where case-binding is set for both of the print jobs or case-binding is not set for either of the print jobs, the process moves to S1409, whereas in the case where case-binding is set for only one of the print jobs, the process moves to S1408. In S1408, the CPU 114 finds an amount of time required to adjust the case binder in the case where the two print jobs obtained in S1407 are printed in succession. The productivity is determined to drop by the amount of time that has been found, and that amount of time is stored in the RAM 113 as the productivity change amount.

The process then moves to S1409, where the CPU 114 obtains, from the job management table, the information of the print job expected to be printed immediately before the print job being dragged, in the current print job list printing order. For example, in the case where the print job (Job D) is being dragged, the information of the print job (Job C), which is located immediately in front of the print job (Job D) in the list illustrated in FIG. 3B, is obtained. Then, the CPU 114 determines whether or not case-binding is set for only either one of the information of the print job being dragged and the print jobs executed in front of the print job being dragged in the current printing order. In the case where case-binding is set for both of the print jobs or case-binding is not set for either of the print jobs, the process moves to S1411, whereas in the case where case-binding is set for only one of the print jobs, the process moves to S1410. In S1410, the CPU 114 finds an amount of time required to adjust the case binder in the case where the two obtained print jobs are executed in succession. The amount of time found here is assumed to be the amount of time by which the productivity can be increased, and that amount of time is stored in the RAM 113 as the productivity change amount.

The process then moves to S1411, where the CPU 114 obtains, from the job management table, the information of the print job expected to be printed immediately after the print job being dragged, in the current print job list printing order. For example, in the case where the print job (Job D) is being dragged, the information of the print job (Job E), which is located immediately behind the print job (Job D) in the list illustrated in FIG. 3B, is obtained. Then, the CPU 114 determines whether or not case-binding is set for only one of the print job being dragged and the print job executed immediately after the print job being dragged, in the current printing order. In the case where case-binding is set for both of the print jobs or case-binding is not set for either of the print jobs, the process moves to S1413, whereas in the case where case-binding is set for only one of the print jobs, the process moves to S1412. In S1412, the CPU 114 finds an amount of time required to adjust the case binder in the case where the two obtained print jobs are executed in succession. The amount of time found here is assumed to be the amount of time by which the productivity can be increased, and that amount of time is stored in the RAM 113 as the productivity change amount.

In this manner, the process moves to S1413, where the CPU 114 displays information indicating the total productivity change amount caused by the case binder being adjusted at the location of the line of the print job that is currently being dragged and is stopped, as the productivity change amount occurring in the case where that print job is moved.

Figure 5B:
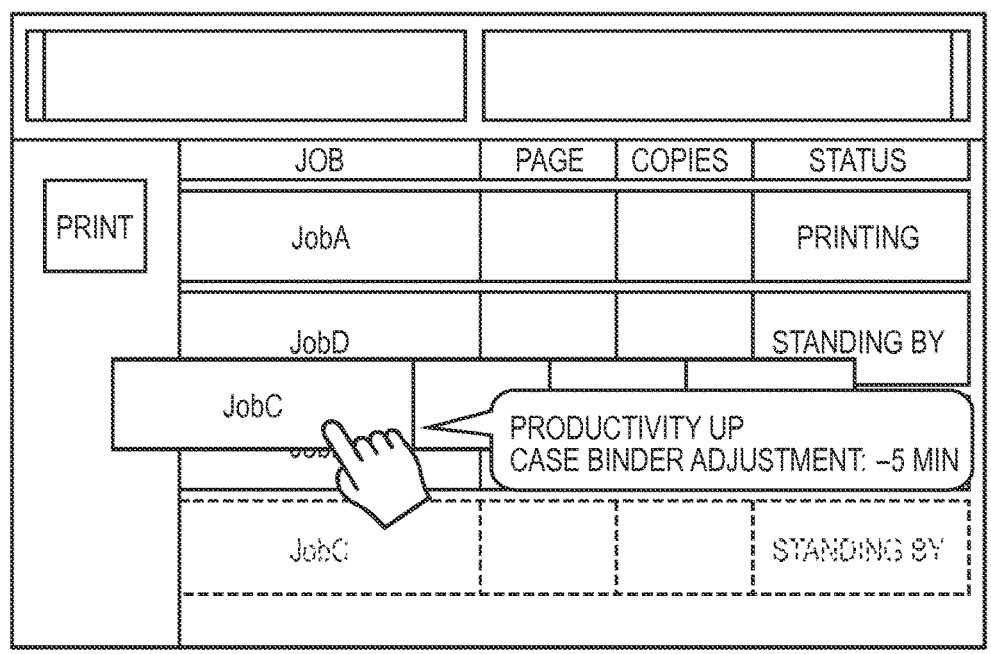
FIG. 5B is a diagram illustrating an example in which a productivity change amount caused by a case binder being adjusted is displayed when the execution order of print jobs is changed.

FIG. 5B is a diagram illustrating an example in which a display of the productivity change amount caused by the case binder being adjusted is added to the line of the print job being dragged.

In FIG. 5B, the display indicates that the productivity will be increased if the print job (Job C) being dragged is moved behind the print job (Job D), with the amount of time required to adjust the case binder dropping by five minutes. In this state, in the case where the user drops the print job (Job C) at the current position, the printing order of the print jobs in the print queue will be changed in accordance with that position in S1106 of FIG. 11.

As described thus far, according to the present embodiment, when the line of a print job is dragged in the print job list and the execution order of the print jobs is changed as a result, the productivity change amount resulting from the time required to adjust the case binder can be displayed in real time, in accordance with the position to which the job has been moved. Accordingly, the user can confirm whether or not the overall productivity of the jobs will drop due to the case binder being adjusted simply by changing the print job order, without actually executing the print jobs.

When Displaying Information Regarding a Paper Feed Tray

Next, an example in which information regarding a paper feed tray is displayed as printing assistance information will be described.

Figure 15:
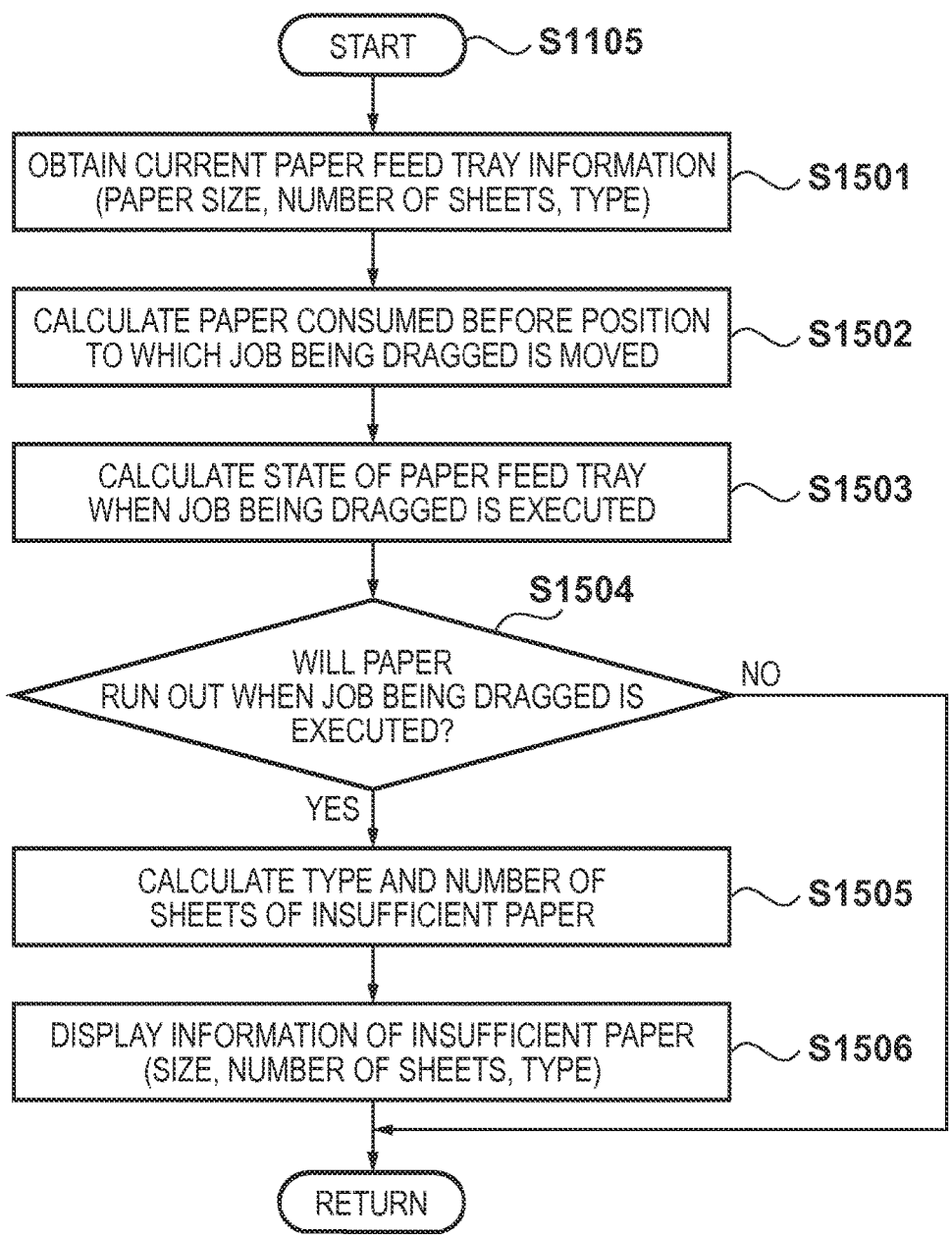
FIG. 15 is a detailed flowchart illustrating a case where the processing of S1105 in FIG. 11 displays information regarding a paper feed tray.

FIG. 15 is a flowchart illustrating a case where the processing of S1105 in FIG. 11 displays information regarding a paper feed tray. Accordingly, details such as the detection of dragging operations, the obtainment of job information, and so on will be omitted here.

In S1501, the CPU 114 obtains, from the paper feed unit 130, information regarding the paper currently held in a paper feed tray of the printing apparatus 110 (such as paper size, type, number of sheets, and so on). Next, the process moves to S1502, where the CPU 114 specifies, in the print job list that shows the printing order, a job that matches the information of the print job being dragged. The CPU 114 then obtains, from the print job management table (FIG. 10), information (size, type, number of sheets) of the paper used in all of the print jobs expected to be printed before the specified print job. Next, the process moves to S1503, where the CPU 114 obtains information of the paper currently held in the paper feed tray and the information of the paper used in the print job expected to be executed before the print job being dragged. Based on this paper information, the information of the paper that will be held in the paper feed tray when the print job being dragged is executed is found. Then, the process moves to S1504, where based on the information of the paper used to print the print job being dragged and the information of the paper held in the paper feed tray found in S1503, the CPU 114 determines whether or not the paper will run out when the print job being dragged is executed. In the case where the CPU 114 determines in S1504 that the paper will run out, the process moves to S1505, whereas in the case where the CPU 114 determines that the paper will not run out, the process simply ends. In S1505, the CPU 114 finds the type and the number of sheets of the paper that will be insufficient when the print job being dragged is executed. The process then moves to S1506, where based on the information of the paper that will be insufficient, the CPU 114 displays, at the location of the line of the print job currently being dragged in the operating panel 120, the size, type, and category of the insufficient paper as well as the paper feed tray that holds that paper, for the case where that print job is moved.

Figure 6A:
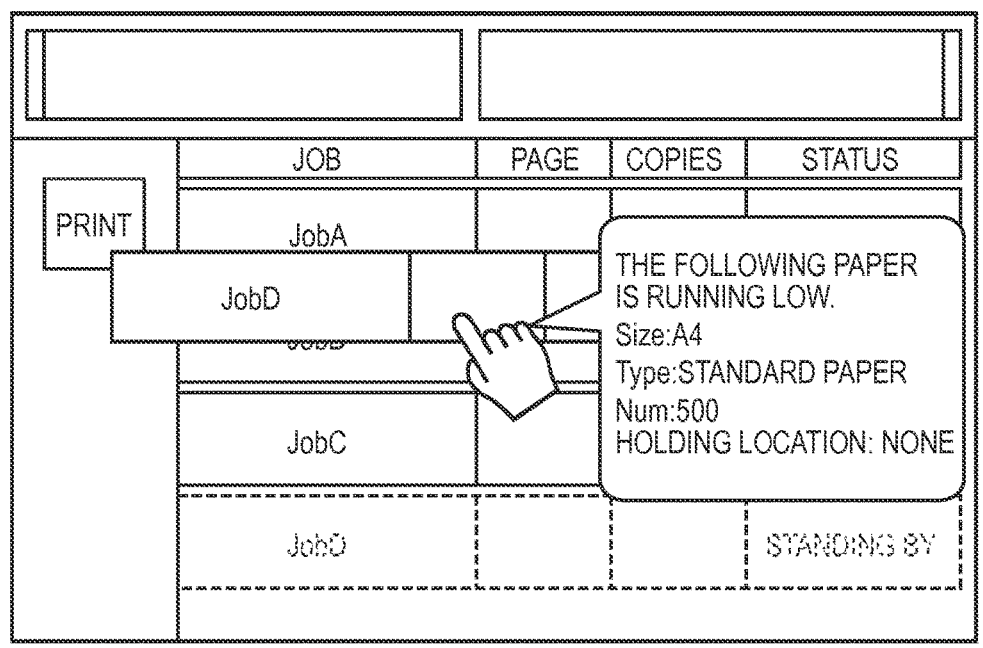
FIG. 6A is a diagram illustrating a display example in which insufficient paper information and a display indicating a paper feed tray in which that paper is held has been added when the execution order of print jobs is changed.

FIG. 6A is a diagram illustrating a display example in which a display indicating the size, type, and category of the insufficient paper as well as the paper feed tray that holds that paper has been added to the line of the print job (Job D) being dragged. FIG. 6A indicates that the paper will run out, that the size of that paper is A4, the paper is standard paper, and that 500 sheets are required, and that there is no paper feed tray that holds paper matching that information.

In the case where the user drops the print job (Job D) in that position in such a state, the printing order will be changed in the print queue in S1106 of FIG. 11, in accordance with the dropping operation performed by the user.

As described thus far, according to the present embodiment, when the line of a print job is dragged in the print job list and the execution order of the print jobs is changed as a result, the information of the paper used in that print job, the information regarding the paper feed tray, and so on can be displayed in real time, in accordance with the position to which the job is moved. Accordingly, the user can confirm whether or not paper that enables that print job to be executed is present simply by changing the print job order, without actually executing the print jobs. The user can thus prevent printing from stopping due to the paper running out as a result of the print job execution order being changed.

When the Destination of the Print Job being Dragged is in Front of a Print Job Currently being Printed Next, printing assistance information displayed in the case where the destination of the print job being dragged is in front of a print job currently being printed will be described.

Figure 16A:
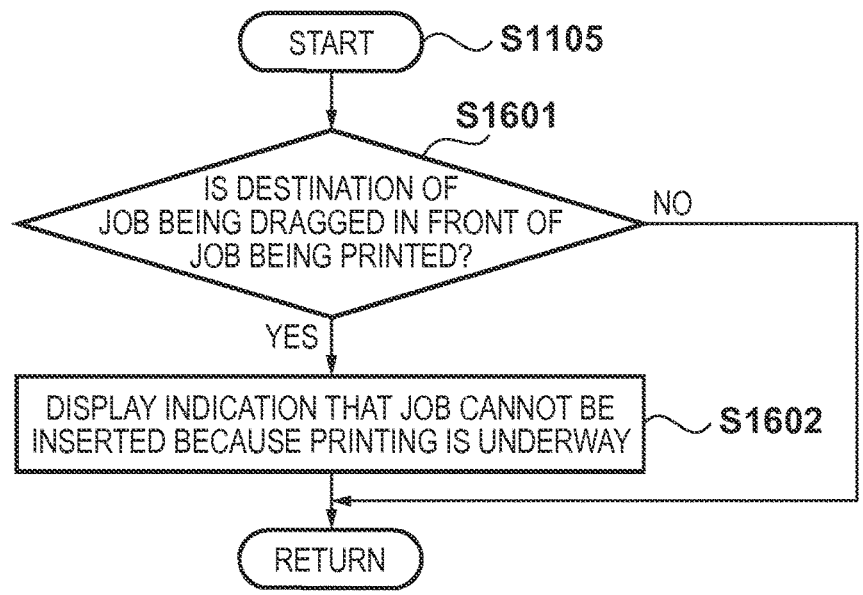
FIGS. 16A and 16B are flowcharts illustrating processing in the case where the processing of S1105 in FIG. 11 has moved a dragged print job in front of a print job currently being printed.
Figure 16B:
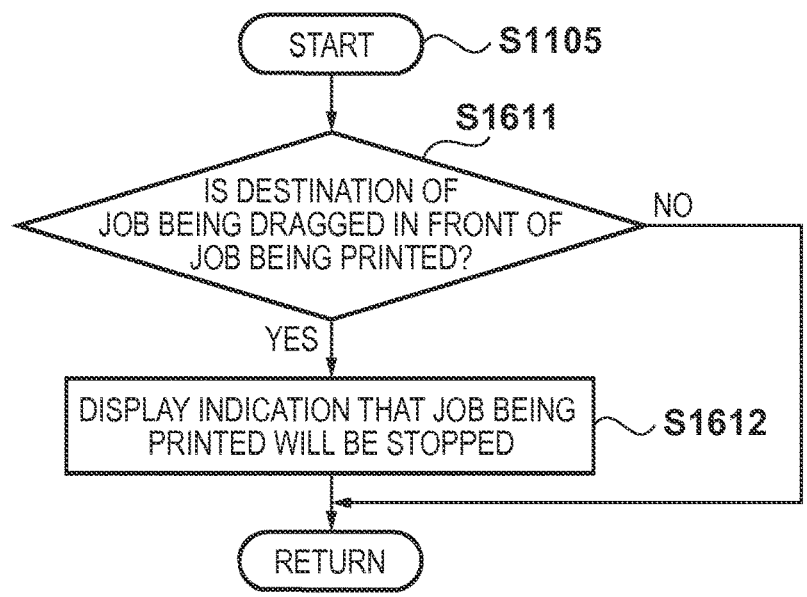

FIGS. 16A and 16B are flowcharts illustrating processing in the case where the processing of S1105 in FIG. 11 attempts to move a dragged print job in front of a print job currently being printed. Accordingly, details such as the detection of dragging operations, the obtainment of job information, and so on will be omitted here.

FIG. 16A is a flowchart illustrating processing in the case where another print job is not permitted to be inserted in front of the print job currently being printed.

In S1601, the CPU 114 specifies the print job corresponding to the line of the print job currently being dragged, and obtains, from the print job management table, the information of a print job expected to be printed after the print job being dragged. Then, the process moves to S1602 in the case where the CPU 114 determines that a print job currently being printed is present behind the moved print job based on the obtained print job information, whereas the process simply ends when such is not the case. In S1602, an attempt is being made to insert the print job currently being dragged in front of the print job currently being printed, and thus the CPU 114 displays, in the operating panel 120, an indication that the print job currently being dragged cannot be moved to the position where the print job is currently dragged.

Figure 6B:
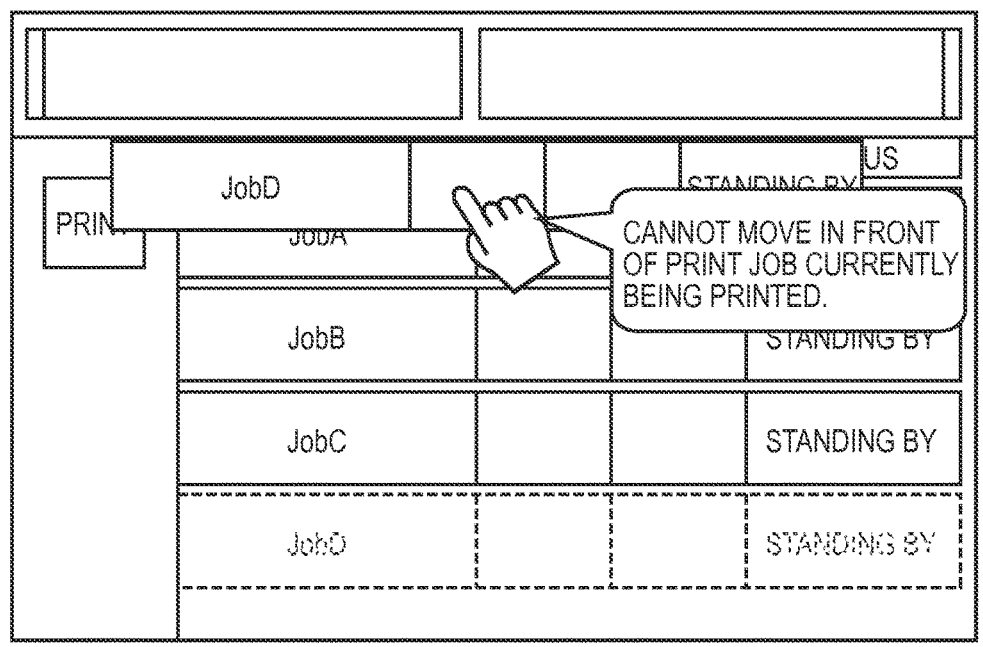
FIG. 6B is a diagram illustrating a display example in the case where a print job being dragged is not permitted to be inserted in front of a print job currently being printed.

FIG. 6B is a diagram illustrating a display example in the case where the print job being dragged is not permitted to be inserted in front of the print job currently being printed.

In FIG. 6B, the print job (Job D) being dragged has been moved in front of the print job (Job A), which is currently being printed. Accordingly, a message reading "cannot move in front of print job currently being printed" is displayed at the print job (Job D), indicating to the user that the print job being dragged cannot be moved to the position to which the print job has been dragged.

Note that in the case where the user drops the print job being dragged in that position while in the state shown in FIG. 6B, the process ends without the printing order of the print job (Job D) being changed in S1106 of FIG. 11.

FIG. 16B is a flowchart illustrating processing in the case where another print job is permitted to be inserted in front of the print job currently being printed.

The processing of S1611 is the same as the processing of S1601 in the aforementioned FIG. 16A, and thus descriptions thereof will be omitted. When the job has been moved in front of the job currently being printed in S1611, the process moves to S1612; here, because an attempt is being made to insert the print job currently being dragged in front of the print job currently being printed, the CPU 114 displays an indication that the job being printed will be stopped.

Figure 7A:
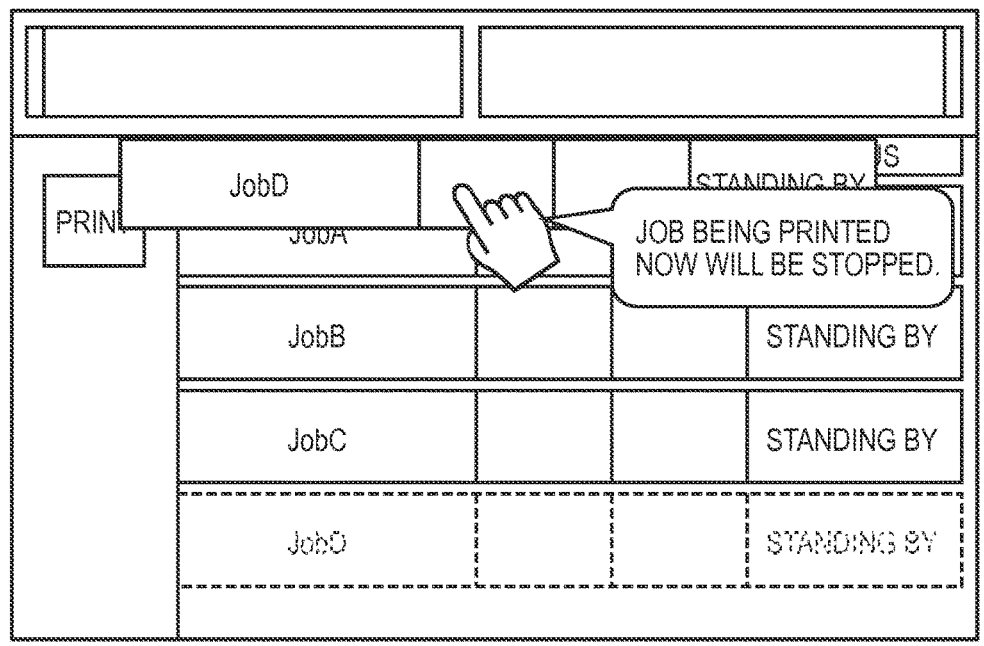
FIG. 7A is a diagram illustrating an example of a display in the case where an indication that a job currently being printed will be stopped due to a dragged print job being moved in front of the print job currently being printed is displayed.

FIG. 7A is a diagram illustrating an example of a display in the case where an indication that the job currently being printed will be stopped due to the dragged print job being moved in front of the print job currently being printed is displayed. In FIG. 7A, the print job (Job D) being dragged has been moved in front of the print job (Job A), which is currently being printed. Accordingly, in this case, the printing process of the print job (Job A) currently being printed is stopped.

In the case where the user drops the print job (Job D) in the current position while in the state shown in FIG. 7A, the CPU 114 issues an instruction to stop the print job (Job A) currently being executed to the printer engine 140 in S1106 of FIG. 11. After the instruction to stop the print job currently being executed has been made, the printing order of the print job (Job D) is changed in accordance with the dropping operation performed by the user.

According to the present embodiment as described thus far, in the case where the line of a print job is dragged in the print job list, the print job execution order is changed, and the destination of that print job is in front of a print job currently being printed, an indication of how the operations will proceed in the case where the change is actually made can be displayed. Accordingly, the user can immediately ascertain the reason for unintended results such as a job being printed stopping simply because the print job order has been changed, an unintended execution order being produced, and so on.

When an Attempt is Made to Change the Printing Order of a Job Currently being Printed Next, the display of printing assistance information in the case where an attempt is made to change the printing order of a job currently being printed will be described.

FIGS. 17A and 17B are flowcharts illustrating processing in the case where changing the printing order of a print job currently being printed is permitted. Accordingly, details such as the detection of dragging operations, the obtainment of job information, and so on will be omitted here.

FIG. 17A is a flowchart illustrating processing in the case where changing the printing order of the print job currently being printed is not permitted.

First, in S1701, the CPU 114 obtains, from the print job management table, the printing conditions of the print job currently being dragged. The process moves to S1702 if the obtained printing conditions indicate that the job is being printed, whereas the process simply ends if the job is standing by to be printed. In S1702, the print job currently being dragged is a job that is being printed, and thus the CPU 114 displays, in the operating panel 120, an indication that the printing order thereof cannot be changed.

Figure 7B:
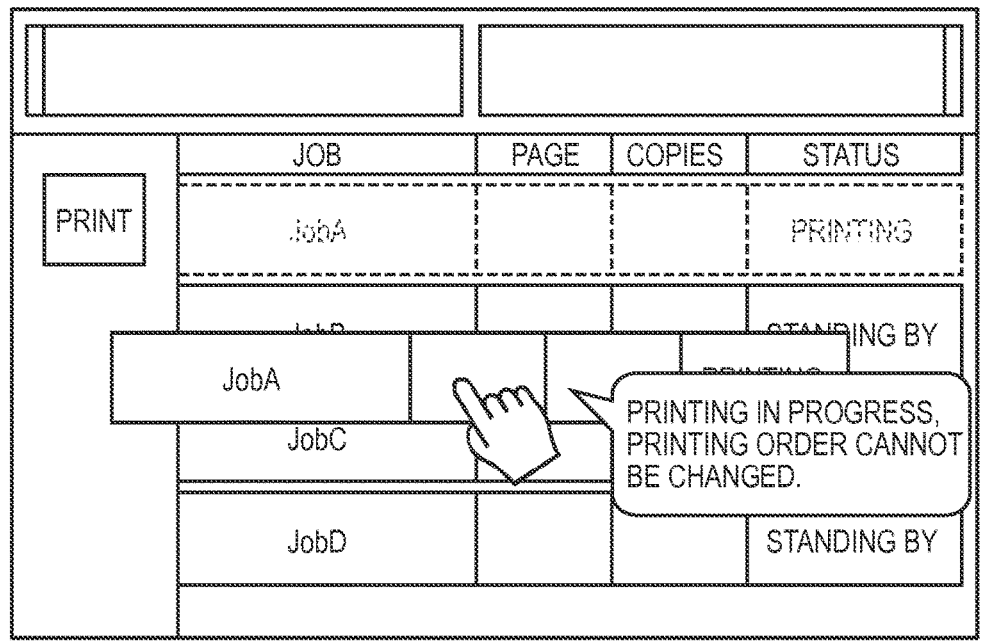
FIG. 7B is a diagram illustrating an example of a display indicating that the printing order of the print job currently being printed cannot be changed.

FIG. 7B is a diagram illustrating an example of a display indicating that because a print job currently being printed has been moved, the printing order of the print job currently being printed cannot be changed. In FIG. 7B, an attempt is being made to drag the print job (Job A), for which a printing process is currently being executed, and change the execution order thereof, and thus a message reading "printing in progress, printing order cannot be changed" is displayed.

In the case where the user drops the print job (Job A) in the display state shown in FIG. 7B, the CPU 114 ends the processing without changing the print job execution order in S1106 of FIG. 11.

FIG. 17B is a flowchart illustrating processing in the case where changing the printing order of the print job currently being printed is permitted.

The processing of S1711 is the same as the processing of S1701 in the aforementioned FIG. 17A, and thus descriptions thereof will be omitted. In the case where the dragged print job is being printed in S1711, the process moves to S1712, where in the case where the printing order of the print job has been changed, the CPU 114 displays, in the operating panel 120, an indication that the printing process of that print job will be stopped.

FIG. 8A is a diagram illustrating an example of a display indicating that moving the print job (Job A) currently being printed will result in the printing process of that print job being stopped.

In the case where the user drops the print job (Job A) in the displayed position while in the state shown in FIG. 8A, an instruction to stop the job currently being executed is issued to the printer engine 140 in S1106 of FIG. 11. After the instruction to stop the print job currently being executed has been made, the execution order of the print job is changed in accordance with the dropping operation performed by the user.

According to the present embodiment as described thus far, it is possible to display the manner in which operations will be affected if the execution order of a job currently being printed is changed. Accordingly, the user can immediately ascertain the reason for unintended results such as a job being printed stopping because the print job order has been changed, the print job execution order being changed in an unintended manner, and so on.

When an Attempt is Made to Change the Printing Order of a Job Belonging to a Group Job Next, the display of printing assistance information in the case where an attempt is made to change the printing order of a job belonging to a group job will be described.

Figure 18:
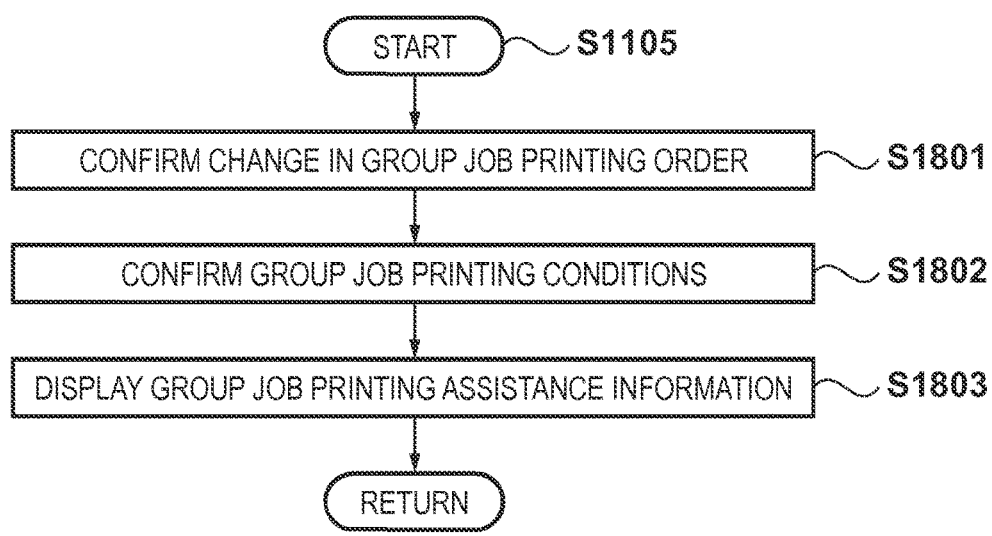
FIG. 18 is a flowchart illustrating a case where the processing of S1105 in FIG. 11 changes the printing order of a job belonging to a group job.

FIG. 18 is a flowchart illustrating a case where the processing of S1105 in FIG. 11 changes the printing order of a job belonging to a group job. Accordingly, details such as the detection of dragging operations, the obtainment of job information, and so on will be omitted here.

First, in S1801, the CPU 114 determines a change in the printing conditions based on whether or not the print job currently being dragged is a group print job, determines details to be displayed, and stores a result thereof in the RAM 113. Then, the process moves to S1802, where the CPU 114 determines the change in the printing conditions based on printing conditions of a group job to which the print job currently being dragged belongs, determines details to be displayed, and stores the details in the RAM 113. The process then moves to S1803, where the CPU 114 obtains the display details stored in the RAM 113 in S1801 and S1802, and displays, in the operating panel 120, information regarding a change in the printing order of the group job to which the job currently being dragged belongs.

Figure 19A:
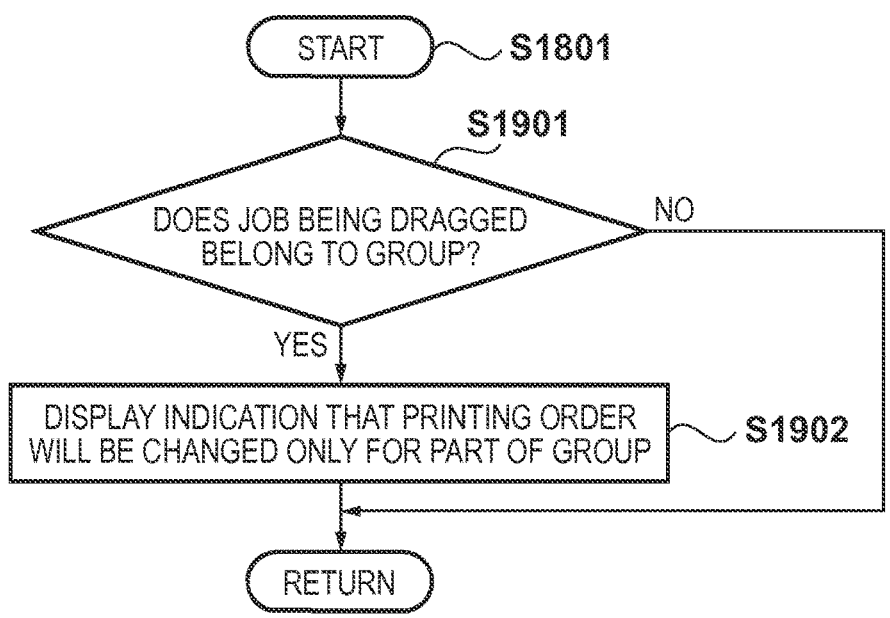
FIGS. 19A and 19B are flowcharts illustrating details of another process performed in S1801 of FIG. 18.
Figure 19B:
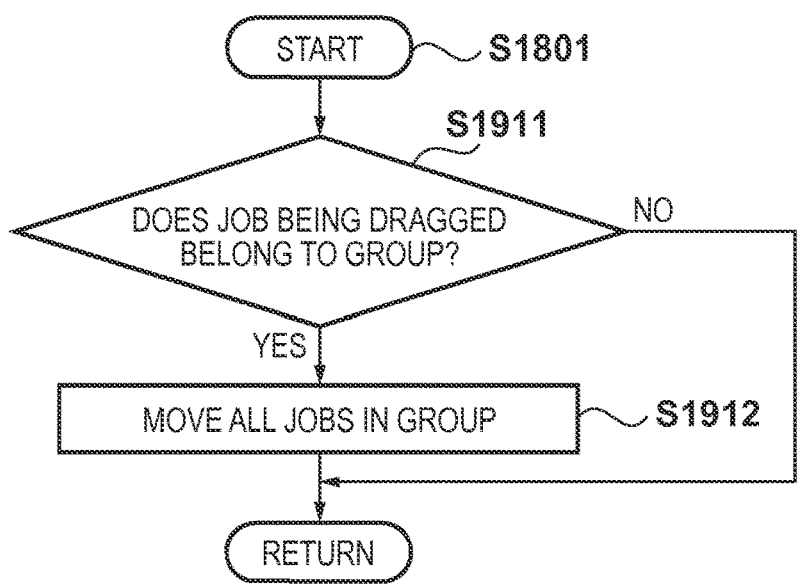

FIGS. 19A and 19B are flowcharts illustrating details of the process performed in S1801 of FIG. 18. Accordingly, details of the display of information will be omitted in the following descriptions.

FIG. 19A is a flowchart for the case where changing the execution order is permitted only for some print jobs that belong to a group job.

First, in S1901, the CPU 114 determines whether or not the print job currently being dragged belongs to a group, based on the job information of that print job. The process moves to S1902 in the case where it is determined that the print job belongs to a group, whereas the process simply ends in the case where it is determined that the print job does not belong to a group. In S1902, the CPU 114 stores, in the RAM 113, UI details indicating that the print job currently being dragged belongs to a group but that the execution order will be changed only for the print job being dragged.

If the user drops the print job while the UI indicating that the execution order will be changed only for the print job currently being dragged is displayed, the print job execution order is changed in the print job management table in S1106 of FIG. 11. In other words, information regarding the group is deleted from attributes of the print job currently being dragged in the print job management table, and the print job execution order is changed in accordance with the dropping operation performed by the user.

FIG. 19B is a flowchart for the case where the entire printing order of jobs belonging to a group is changed.

The processing of S1911 is the same as S1901 in FIG. 19A, and thus descriptions thereof will be omitted. In the case where the print job being dragged belongs to a group in S1911, the process moves to S1912, where the CPU 114 stores, in the RAM 113, UI details indicating that the overall printing order of the group will be changed.

In this case, a UI indicating that dragging a print job will change the overall printing order of the group to which that print job belongs is displayed. If the user then drops the print job being dragged in that state, the group to which the print job currently being dragged belongs is obtained from the print job management table in S1106 of FIG. 11. The printing order of all of the print jobs belonging to that group is then changed.

Through this, it is possible to perform a process that moves the entire group to which the print job being dragged belongs, or that moves only the print job being dragged in that group.

Figure 20A:
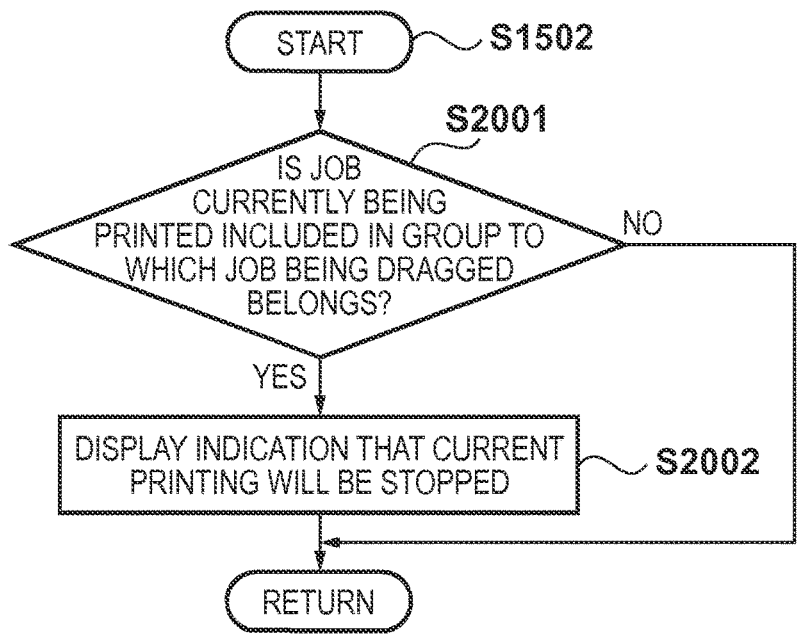
FIGS. 20A and 20B are flowcharts illustrating details of another process performed in S1802 of FIG. 18.
Figure 20B:
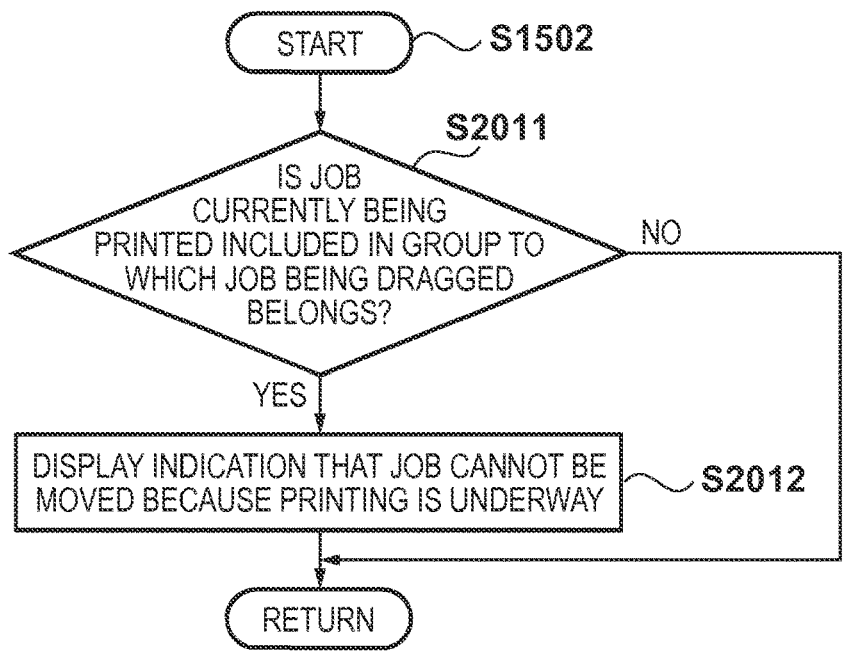

FIGS. 20A and 20B are flowcharts illustrating processing carried out in S1802 of FIG. 18.

FIG. 20A is a flowchart indicating processing performed in the case where changing the printing order is permitted even if a print job belonging to a group job is currently being printed.

First, in S2001, the CPU 114 obtains, from the print job management table, the printing conditions of all of the print jobs belonging to the same group to which the print job currently being dragged belongs. It is then determined whether there is a print job, in the obtained print jobs, that is currently being printed; the process moves to S2002 in the case where it is determined that there is a job being printed, whereas the process simply ends when such is not the case. In S2002, the group to which the print job currently being dragged belongs includes a job that is currently being printed, and thus the CPU 114 displays an indication that the execution of the print job currently being printed will be stopped.

FIG. 8B is a diagram illustrating an example of the display made when the line of the print job (Job A) currently being executed is dragged and moved. Here, the entire group to which the print job (Job A) belongs is moved in response to the line of the print job (Job A) being dragged, and an indication that the printing process of the print job (Job A) that is currently being printed will be stopped is displayed.

If the user drops the print job (Job A) in this state, the printing order of the print job (Job A) and the jobs in the group to which the print job (Job A) belongs are changed in S1106 of FIG. 11. Note that in the case where the printing apparatus permits the execution order of some of the print jobs in the group to be changed, the execution order is changed in accordance with the dropping operation performed by the user in S1106. In the case where the execution order is set to be changed for all of the print jobs belonging to the group, an instruction to stop the print job currently being executed is issued to the printer engine 140 at this time. The print job execution order is changed in accordance with the dropping operation performed by the user thereafter.

FIG. 20B is a flowchart illustrating processing performed in the case where changing the printing order is not permitted when a job belonging to a group job is being printed.

The processing of S2011 is the same as S2001 in FIG. 20A, and thus descriptions thereof will be omitted. In the case where part of a group to which the print job currently being dragged belongs is currently being printed in S2011, the process moves to S2012, where the CPU 114 displays an indication that the printing order cannot be changed.

FIG. 9A is a diagram illustrating an example of a display made when the line of the print job (Job A) currently being executed is dragged and moved. Here, because the group to which the print job (Job A) being dragged belongs includes a job that is currently being printed, an indication that the printing order cannot be changed is displayed.

In the case where the user drops the print job (Job A) in this state, the processing is ended without changing the printing order in S1106 of FIG. 11.

According to the present embodiment as described thus far, in the case where the print job being dragged belongs to a group, the manner in which changing the printing order will affect operations can be displayed. Through this, it is possible to prevent the printing order for a print job belonging to a given group from being changed against the user's intentions.

According to the embodiments described thus far, the execution order of a job can be changed by carrying out an operation for dragging a job in a job list displayed in a touch panel. At this time, changes in printing conditions caused by the change in the execution order of the job can be displayed in real time. Through this, the user can change the execution order of the job having understood that changing the execution order of the job will also change the printing conditions. Accordingly, printing conditions unintended on the part of the user can be prevented from occurring due to the execution order of the job being changed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-239236, filed Nov. 19, 2013, which is hereby incorporated by reference herein in its entirety.

What is claimed is:

1. An information processing apparatus comprising:
a display;
a user interface which receives a user's operation; and
a controller which controls the information processing apparatus, wherein the controller is configured to function as:
a storage unit configured to store job information of jobs;
a display control unit configured to display, on the display, a list of objects corresponding respectively to the jobs, the objects in the list being arranged in an execution order of the corresponding jobs;
an accepting unit configured to accept, via the user interface, a user's drag operation for dragging an object in the list being displayed and a user's drop operation for dropping, on a position on the list being displayed, the dragged object in order to change the execution order of the jobs;
a predicting unit configured to predict, during the user's drag operation for the object and before the user's drop operation for the object, an effect to be caused by the change of the execution order of the jobs by the drag and drop operations for the object, based on the job information of at least the job corresponding to the dragged object and another job corresponding to the position on the list; and
a changing unit configured to change the execution order of the jobs, in accordance with the user's drop operation for the object,
wherein the display control unit further displays, during the user's drag operation for the object and before the user's drop operation for the object, the predicted effect on the display in addition to the list.

2. The information processing apparatus according to claim 1, wherein the predicted effect indicates an expected start time and an expected end time of the job.

3. The information processing apparatus according to claim 1, wherein the predicted effect indicates an expected change in productivity.

4. The information processing apparatus according to claim 1, wherein the predicted effect indicates an expected change regarding paper shortage.

5. The information processing apparatus according to claim 1, wherein the display control unit further displays information indicating whether or not changing the execution order of the job by the drag and drop operations for the object is permitted.

6. The information processing apparatus according to claim 2, wherein the controller is further configured to function as an obtaining unit configured to obtain the expected start time and the expected end time of the job based on an end time of a job located immediately before the job whose execution order has been changed and an amount of time required to execute the job whose execution order is changed,
wherein the display control unit displays the expected start time and the expected end time obtained by the obtaining unit.

7. The information processing apparatus according to claim 3, wherein the controller is further configured to function as an obtaining unit configured to obtain a time required to adjust a fixing unit, based on a fixing mode of jobs located before and after the job whose execution order is changed, a fixing mode of jobs located in front of and behind the job before the execution order of the job is changed, and a fixing mode of the job whose execution order is changed,
wherein the display control unit displays the expected change in the productivity resulting from the time required to adjust the fixing unit obtained by the obtaining unit.

8. The information processing apparatus according to claim 3, wherein the controller is further configured to function as an obtaining unit configured to obtain a time required to adjust a case binder, based on a case-binding setting of jobs located before and after the job whose execution order is changed, a case-binding setting of jobs located before and after the job before the execution order of the job is changed, and a case-binding setting of the job whose execution order is changed,
wherein the display control unit displays the expected change in the productivity resulting from the time required to adjust the case binder obtained by the obtaining unit.

9. The information processing apparatus according to claim 4, wherein the controller is further configured to function as an obtaining unit configured to obtain first information of paper that will be used until the job, whose execution order is changed, is executed and second information of paper held in a paper feed tray,
wherein the display control unit displays the expected change regarding paper shortage in accordance with the first and second information of paper obtained by the obtaining unit.

10. The information processing apparatus according to claim 5, wherein in a case where, by changing the execution order of the job, the job is located before a job currently being executed, the display control unit displays information indicating that changing the execution order of the job by the drag and drop operations for the object is not permitted.

11. The information processing apparatus according to claim 5, further comprising a stopping unit configured to stop execution of a job currently being executed in a case where, by changing the execution order of the job by the drag and drop operations for the object, the job is located before the job currently being executed.

12. The information processing apparatus according to claim 5, wherein in a case where a job currently being executed is targeted for changing the execution order by the changing unit, the display control unit displays information indicating that changing the execution order of the job by the drag and drop operations for the object is not permitted.

13. The information processing apparatus according to claim 5, wherein the controller is further configured to function as a stopping unit configured to stop execution of a job currently being executed in a case where the job currently being executed is targeted for changing the execution order by the changing unit.

14. The information processing apparatus according to claim 1, wherein in a case where the job whose execution order is changed by the changing unit belongs to a group, the changing unit changes the execution order of other jobs belonging to the group along with the job.

15. The information processing apparatus according to claim 1, wherein in a case where the job whose execution order is changed by the changing unit belongs to a group, the changing unit changes the execution order of some of other jobs belonging to the group along with the job.

16. The information processing apparatus according to claim 5, wherein in a case where the job whose execution order is changed by the changing unit belongs to a group and the group includes a job currently being executed, the display control unit displays information indicating that changing the execution order of the job by the drag and drop operations for the object is not permitted.

17. The information processing apparatus according to claim 5, wherein the controller is further configured to function as a stopping unit configured to, in a case where the job whose execution order is changed by the changing unit belongs to a group and the group includes a job currently being executed, stop execution of the job currently being executed.

18. The information processing apparatus according to claim 1, wherein the user's drag operation is an operation in which a user drags a line in which the job is displayed in the list and moves a position of the line of the job in the list.

19. A method, executed by an information processing apparatus, of changing an execution order of jobs by drag-and-drop operation, the method comprising:
storing job information of the jobs;
displaying a list of objects corresponding respectively to the jobs, the objects in the list being arranged in the execution order of the corresponding jobs;
accepting a user's drag operation for dragging an object in the list being displayed;
during the user's drag operation for the object and before a user's drop operation for dropping of the dragged object on a position on the list being displayed in order to change the execution order of the jobs, predicting an effect to be caused by the change of the execution order by the drag and drop operations for the object, using the job information of at least one of the jobs corresponding to the position;
during the user's drag operation for the object and before the user's drop operation for the object, displaying the predicted effect in addition to the list;
accepting the user's drop operation for the object being dragged; and
according to the accepting of the user's drop operation for the object being dragged, changing the execution order of the jobs.

20. The information processing apparatus according to claim 1, wherein the predicting unit predicts, based on a position of dragged object, during the user's drag operation for the object and before the user's drop operation for the object, another effect to be caused by another change of the execution order of the jobs by the drag and drop operations for the object.

21. The information processing apparatus according to claim 1, wherein the predicting unit determines the another job based on the position, and predicts the effect using the job information of the determined job.

22. The information processing apparatus according to claim 1, wherein, in the prediction of the effect, the predicting unit calculates a difference between a current execution order of the jobs and an execution order of the jobs to be caused by the drag and drop operations for the object, and predicts the effect in accordance with the calculated difference.

23. The information processing apparatus according to claim 1, wherein the predicted effect is displayed in the list by the display control unit, during the user's drag operation for the object and before the user's drop operation for the object.

24. The information processing apparatus according to claim 1, wherein each of the objects in the list indicates at least one of a job name and a job status of a corresponding job.

25. The information processing apparatus according to claim 1, wherein the list indicates the execution order of the jobs by arrangement of the objects corresponding to the jobs from a top to a bottom of the list, a job corresponding to an object which is arranged at the top of the list being in execution.

26. The information processing apparatus according to claim 1,
wherein the jobs are print jobs and the list is a print job list of job information objects corresponding respectively to the print jobs,
wherein the job information objects are arranged in a print order of the print jobs from a top to a bottom of the print job list, and each of the job information objects in the print job list displays at least one of a print job name and a print job status of a corresponding print job.

27. A method for controlling a print order of print jobs, comprising:
displaying a job list of print job objects corresponding respectively to the print jobs, the print job objects in the job list being arranged in a current print order of the print jobs;
accepting a user's drag operation for dragging a print job object in the job list being displayed;
accepting a user's drop operation for dropping, in the job list being displayed, the print job object being dragged;
in accordance with a position in the job list at which the dragged print job object is dropped, changing the print order of the print jobs; and
updating the job list being displayed so that the print job objects in the job list are arranged in the changed print order of the print jobs.

28. The method according to claim 27, further comprising:
- after accepting the user's drag operation for the print job object and before accepting a user's drop operation for the print job object being dragged, predicting an effect to be caused by the change of the print order by the drag and drop operations for the print job object, in accordance with a difference between the current print order of the print jobs and a predicted print order of the print jobs to be caused by the drag and drop operations for the print job object; and
- after accepting the user's drag operation for the print job object and before accepting the user's drop operation for the print job object being dragged, displaying the predicted effect, and leaving the job list displayed.

29. The method according to claim 27, wherein the print job objects are arranged from a top to a bottom of the job list in the print order of the print jobs, and each print job object in the job list displays at least one of a print job name and a print job status of a corresponding print job.

* * * * *